US012780976B2

(12) United States Patent
Nakagawa et al.

(10) Patent No.: US 12,780,976 B2
(45) Date of Patent: Nov. 3, 2026

(54) POLYURETHANE DISPERSION, GAS BARRIER COATING MATERIAL, AND LAMINATE

(71) Applicant: MITSUI CHEMICALS, INC., Tokyo (JP)

(72) Inventors: Toshihiko Nakagawa, Chiba (JP); Kazuyuki Fukuda, Ichihara (JP); Tomoki Sugihara, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 608 days.

(21) Appl. No.: 18/273,645

(22) PCT Filed: Jan. 18, 2022

(86) PCT No.: PCT/JP2022/001596
§ 371 (c)(1),
(2) Date: Jul. 21, 2023

(87) PCT Pub. No.: WO2022/158445
PCT Pub. Date: Jul. 28, 2022

(65) Prior Publication Data

US 2024/0101748 A1 Mar. 28, 2024

(30) Foreign Application Priority Data

Jan. 22, 2021 (JP) ................................ 2021-008895
Apr. 23, 2021 (JP) ................................ 2021-073471

(51) Int. Cl.
*C08G 18/12* (2006.01)
*C08G 18/32* (2006.01)
(Continued)

(52) U.S. Cl.
CPC ......... *C08G 18/12* (2013.01); *C08G 18/3206* (2013.01); *C08G 18/7628* (2013.01); *C09D 5/022* (2013.01); *C09D 175/12* (2013.01)

(58) Field of Classification Search
CPC ........................... C08G 18/12; C08G 18/3206; C08G 18/7628; C09D 5/022; C09D 175/12
See application file for complete search history.

(56) References Cited

U.S. PATENT DOCUMENTS

2012/0016075 A1 1/2012 Uchida
2015/0315527 A1* 11/2015 Malaba ............. C08G 18/4238 524/251

FOREIGN PATENT DOCUMENTS

CN 102219886 A 10/2011
CN 103897135 A 7/2014
(Continued)

OTHER PUBLICATIONS

JP2009127061 translation (Year: 2009).*
JP2010229291 translation (Year: 2010).*

*Primary Examiner* — Joseph S Del Sole
*Assistant Examiner* — Andrea Wu
(74) *Attorney, Agent, or Firm* — RANKIN, HILL & CLARK LLP

(57) ABSTRACT

A polyurethane dispersion is an aqueous dispersion of a polyurethane resin. The polyurethane resin is a reaction product of an isocyanate group-terminated prepolymer and a chain extender. The isocyanate group-terminated prepolymer includes a reaction product of a polyisocyanate component containing a xylylene diisocyanate, and an active hydrogen group-containing component containing a short-chain diol having 2 to 6 carbon atoms and an active hydrogen group-containing compound containing a hydrophilic group. The chain extender includes an ethylenedi-
(Continued)

amine. A ratio of the ethylenediamine is 25 mol % or more with respect to the total amount of the chain extender.

7 Claims, 2 Drawing Sheets

(51) Int. Cl.

| | |
|---|---|
| ***C08G 18/76*** | (2006.01) |
| ***C09D 5/02*** | (2006.01) |
| ***C09D 175/12*** | (2006.01) |

(56) References Cited

FOREIGN PATENT DOCUMENTS

| | | | | |
|---|---|---|---|---|
| CN | 108219103 | A | | 6/2018 |
| CN | 111808260 | A | | 10/2020 |
| EP | 0837083 | A2 | | 4/1998 |
| EP | 3398980 | A1 | | 11/2018 |
| JP | 52-19799 | A | | 2/1977 |
| JP | 54-77795 | A | | 6/1979 |
| JP | 2001-98047 | A | | 4/2001 |
| JP | 2009127061 | A | * | 6/2009 |
| JP | 2010-229291 | A | | 10/2010 |
| WO | 2010/110076 | A1 | | 9/2010 |

* cited by examiner

POLYURETHANE DISPERSION, GAS BARRIER COATING MATERIAL, AND LAMINATE

TECHNICAL FIELD

The present invention relates to a polyurethane dispersion, a gas barrier coating material, and a laminate.

BACKGROUND ART

Conventionally, it has been known that gas barrier properties are imparted to a substrate by forming a resin layer containing a polyurethane resin (hereinafter, a polyurethane layer) on the surface of the substrate.

As a method for producing a polyurethane resin, the following has been proposed. First, a carboxylic acid group-containing polyurethane prepolymer is synthesized by a reaction of a hydrogenated XDI, a dimethylol propionic acid, and an ethylene glycol. Next, a carboxylic acid group is neutralized by a triethylamine. Thereafter, the carboxylic acid group-containing polyurethane prepolymer is subjected to a chain extension reaction by an ethylenediamine. Further, a gas barrier film obtained by laminating the polyurethane resin on the surface of a biaxially oriented polypropylene film has been proposed (ref: for example, Patent Document 1 (Production Example 8)).

CITATION LIST

Patent Document

Patent Document 1: Japanese Unexamined Patent Publication No. 2001-98047

SUMMARY OF THE INVENTION

Problem to be Solved by the Invention

On the other hand, as the polyurethane layer, heat resistance may be further required. However, the above-described polyurethane resin does not have the sufficient heat resistance. Further, the polyurethane resin is required to have excellent storage stability.

The present invention provides a polyurethane dispersion and a gas barrier coating material capable of forming a polyurethane layer having excellent gas barrier properties, excellent heat resistance, and excellent storage stability, and further, a laminate including the polyurethane layer.

Means for Solving the Problem

The present invention [1] includes a polyurethane dispersion being an aqueous dispersion of a polyurethane resin, wherein the polyurethane resin is a reaction product of an isocyanate group-terminated prepolymer and a chain extender; the isocyanate group-terminated prepolymer includes a reaction product of a polyisocyanate component containing a xylylene diisocyanate, and an active hydrogen group-containing component containing a short-chain diol having 2 to 6 carbon atoms and an active hydrogen group-containing compound containing a hydrophilic group; the chain extender includes an ethylenediamine; and a ratio of the ethylenediamine is 25 mol % or more with respect to the total amount of the chain extender.

The present invention [2] includes the polyurethane dispersion described in the above-described [1], wherein the active hydrogen group-containing component further contains a trihydric or more alcohol, and a ratio of the trihydric or more alcohol is 1 mol % or more and 15 mol % or less with respect to the total amount of the active hydrogen group-containing component.

The present invention [3] includes the polyurethane dispersion described in the above-described [1] or [2], wherein the polyisocyanate component further contains a methylenebis(cyclohexyl isocyanate), and a content ratio of the methylenebis(cyclohexyl isocyanate) is 1 mol % or more and 30 mol % or less with respect to the total amount of the polyisocyanate component.

The present invention [4] includes the polyurethane dispersion described in any one of the above-described [1] to [3], wherein a coefficient of thermal expansion of the polyurethane resin is $2000\times10^{-6}K^{-1}$ or less.

The present invention [5] includes the polyurethane dispersion described in any one of the above-described [1] to [4] further including at least one kind selected from the group consisting of epoxysilane, water-dispersible polyisocyanate, and carbodiimide compound.

The present invention [6] includes the polyurethane dispersion described in the above-described [5], wherein a content ratio of a carbodiimide group in the carbodiimide compound is 0.3 mol or more and 3.0 mol or less with respect to 1 mol of a carboxy group in the polyurethane resin.

The present invention [7] includes a gas barrier coating material containing the polyurethane dispersion described in any one of the above-described [1] to [6].

The present invention [8] includes a laminate including a substrate and a polyurethane layer disposed on the surface of the substrate, wherein the polyurethane layer is a dried product of the gas barrier coating material described in the above-described [7].

Effect of the Invention

In the polyurethane dispersion of the present invention, the polyisocyanate component contains the xylylene diisocyanate and the chain extender contains the ethylenediamine at a predetermined ratio.

Therefore, the polyurethane dispersion of the present invention contains the polyurethane resin having excellent gas barrier properties, excellent heat resistance, and excellent storage stability.

As a result, the polyurethane dispersion and the gas barrier coating material of the present invention can form the polyurethane layer having the excellent gas barrier properties, the excellent heat resistance, and the excellent storage stability.

In the laminate of the present invention, the polyurethane layer is the dried product of the above-described gas barrier coating material. Therefore, the laminate of the present invention has the excellent gas barrier properties and the excellent heat resistance.

DESCRIPTION OF EMBODIMENTS

Figure 1:
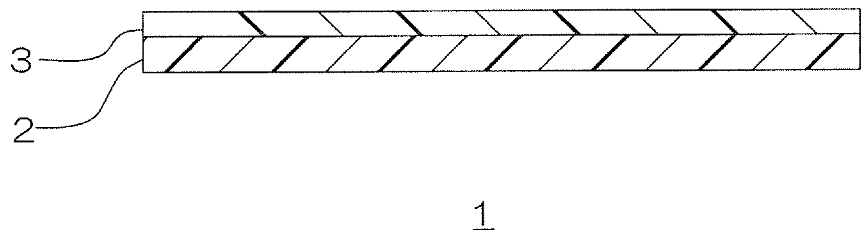
FIG. 1 shows a schematic configuration view for illustrating one embodiment of a laminate using a polyurethane dispersion of the present invention.

A polyurethane dispersion of the present invention is an aqueous dispersion of a polyurethane resin.

Examples of the polyurethane resin include gas barrier polyurethane resins. The gas barrier properties are properties of lowering permeability of oxygen.

The gas barrier polyurethane resin contains a reaction product obtained by reacting at least a polyisocyanate component and an active hydrogen group-containing component.

More specifically, the gas barrier polyurethane resin is obtained by a reaction of an isocyanate group-terminated prepolymer with a chain extender. The isocyanate group-terminated prepolymer is obtained by a reaction of the polyisocyanate component with the active hydrogen group-containing component. In other words, the isocyanate group-terminated prepolymer is a primary reaction product of the polyisocyanate component and the active hydrogen group-containing component. The gas barrier polyurethane resin is a secondary reaction product of the isocyanate group-terminated prepolymer and the chain extender.

In preparing the polyurethane dispersion, for example, first, the isocyanate group-terminated prepolymer is synthesized. The isocyanate group-terminated prepolymer is a polyurethane prepolymer having two or more free isocyanate groups at the molecular terminal. As described above, the isocyanate group-terminated prepolymer is obtained by the reaction of the polyisocyanate component with the active hydrogen group-containing component.

The polyisocyanate component contains a xylylene diisocyanate (XDI) as an essential component.

Examples of the xylylene diisocyanate include xylylene diisocyanate monomers (XDI monomer) and xylylene diisocyanate derivatives (XDI derivative).

Examples of the xylylene diisocyanate monomer include 1,2-xylylene diisocyanate, 1,3-xylylene diisocyanate, and 1,4-xylylene diisocyanate. These xylylene diisocyanate monomers may be used alone or in combination of two or more. As the xylylene diisocyanate monomer, preferably, 1,3-xylylene diisocyanate and 1,4-xylylene diisocyanate are used, more preferably, 1,3-xylylene diisocyanate is used.

An example of the xylylene diisocyanate derivative includes a modified product obtained by modifying the above-described xylylene diisocyanate monomer by a known method. More specifically, examples of the xylylene diisocyanate derivative include multimers, allophanate-modified products, polyol-modified products, biuret-modified products, urea-modified products, oxadiazinetrione-modified products, and carbodiimide-modified products. These xylylene diisocyanate derivatives may be used alone or in combination of two or more.

These xylylene diisocyanates may be used alone or in combination of two or more. As the xylylene diisocyanate, preferably, a xylylene diisocyanate monomer is used.

In addition, the polyisocyanate component may contain another polyisocyanate as an optional component. The other polyisocyanate is a polyisocyanate excluding the xylylene diisocyanate.

Examples of the other polyisocyanate include polyisocyanates which are industrially widely used. More specifically, examples thereof include aromatic polyisocyanates, araliphatic polyisocyanates (excluding the xylylene diisocyanate), aliphatic polyisocyanates, and alicyclic polyisocyanates. Further, examples of the other polyisocyanate include derivatives of the same kind as described above. These other polyisocyanates may be used alone or in combination of two or more.

As the other polyisocyanate, preferably, an alicyclic polyisocyanate is used. Examples of the alicyclic polyisocyanate include bis(isocyanatomethyl)cyclohexane ($H_6XDI$), methylenebis(cyclohexyl isocyanate) ($H_{12}MDI$), and isophorone diisocyanate (IPDI). These alicyclic polyisocyanates may be used alone or in combination of two or more.

As the alicyclic polyisocyanate, preferably, bis(isocyanatomethyl)cyclohexane ($H_6XDI$) and methylenebis(cyclohexyl isocyanate) ($H_{12}MDI$) are used, more preferably, methylenebis(cyclohexyl isocyanate) ($H_{12}MDI$) is used.

When the polyisocyanate component contains the other polyisocyanate, a ratio of the xylylene diisocyanate to the other polyisocyanate is appropriately set as long as it does not damage an excellent effect of the present invention.

For example, when the xylylene diisocyanate and the alicyclic polyisocyanate are used in combination, the ratio of the xylylene diisocyanate is, for example, 50 mol % or more, preferably 60 mol % or more, more preferably 70 mol % or more, further more preferably 80 mol % or more with respect to the total moles of these. Further, the ratio of the xylylene diisocyanate is, for example, 99.9 mol % or less, preferably 99 mol % or less, more preferably 95 mol % or less, further more preferably 90 mol % or less with respect to the total moles of these.

In addition, when the xylylene diisocyanate and the alicyclic polyisocyanate are used in combination, the ratio of the alicyclic polyisocyanate is, for example, 0.1 mol % or more, preferably 1 mol % or more, more preferably 5 mol % or more, further more preferably 10 mol % or more with respect to the total moles of these. Further, the ratio of the alicyclic polyisocyanate is, for example, 50 mol % or less, preferably 40 mol % or less, more preferably 30 mol % or less, further more preferably 20 mol % or less with respect to the total moles of these.

In particular, when the polyisocyanate component contains the xylylene diisocyanate and the chain extender (described later) contains an ethylenediamine, the alicyclic polyisocyanate contributes to heat resistance and storage stability. Therefore, when the polyisocyanate component contains the xylylene diisocyanate and the chain extender (described later) contains the ethylenediamine, as long as the ratio of the alicyclic polyisocyanate is more than the above-described lower limit, it is possible to obtain the polyurethane resin having the more excellent heat resistance. Furthermore, therefore, when the polyisocyanate component contains the xylylene diisocyanate and the chain extender (described later) contains the ethylenediamine, as long as the ratio of the alicyclic polyisocyanate is less than the above-described upper limit, it is possible to obtain the polyurethane resin having the more excellent storage stability.

Examples of the active hydrogen group-containing component include polyol components. The polyol component contains a short-chain diol having 2 to 6 carbon atoms and an active hydrogen group-containing compound containing a hydrophilic group as an essential component.

The short-chain diol having 2 to 6 carbon atoms is an organic compound having two hydroxyl groups and having 2 to 6 carbon atoms. A molecular weight of the short-chain diol is 50 or more and 650 or less. When the short-chain diol has a molecular weight distribution, the molecular weight shows a number average molecular weight in terms of polystyrene by GPC measurement.

Examples of the short-chain diol include alkanediols having 2 to 6 carbon atoms, ether diols having 2 to 6 carbon atoms, and alkenediols having 2 to 6 carbon atoms.

Examples of the alkanediol having 2 to 6 carbon atoms include ethylene glycol, propylene glycol, 1,3-propanediol, 1,4-butylene glycol, 1,3-butylene glycol, 1,2-butylene glycol, 1,5-pentanediol, 1,6-hexanediol, neopentyl glycol, 3-methyl-1,5-pentanediol, 1,3-cyclohexanediol, and 1,4-cyclohexanediol. Examples of the ether diol having 2 to 6 carbon atoms include diethylene glycol, triethylene glycol, and dipropylene glycol. An example of the alkenediol having 2 to 6 carbon atoms includes 1,4-dihydroxy-2-buten. These short-chain diols may be used alone or in combination of two or more. As the short-chain diol, from the viewpoint of the gas barrier properties, preferably, an alkanediol having 2 to 6 carbon atoms is used, more preferably, an ethylene glycol is used.

A content ratio of the short-chain diol having 2 to 6 carbon atoms is, for example, 10 parts by mass or more, preferably 30 parts by mass or more, more preferably 50 parts by mass or more, and for example, 90 parts by mass or less, preferably 80 parts by mass or less, more preferably 70 parts by mass or less with respect to 100 parts by mass of the total amount of the active hydrogen group-containing component.

The active hydrogen group-containing compound containing a hydrophilic group is a compound containing a hydrophilic group and an active hydrogen group. Examples of the active hydrogen group include hydroxyl groups and amino groups.

Further, examples of the hydrophilic group include nonionic groups and ionic groups. More specifically, examples of the active hydrogen group-containing compound containing a hydrophilic group include an active hydrogen group-containing compound containing a nonionic group and an active hydrogen group-containing compound containing an ionic group.

The active hydrogen group-containing compound containing a nonionic group is a compound having one or more nonionic groups and two or more active hydrogen groups in combination. Examples of the nonionic group include polyoxyethylene groups. Examples of the active hydrogen group-containing compound containing a nonionic group include a polyoxyethylene glycol, a one end-capped polyoxyethylene glycol, and a polyol containing a polyoxyethylene side chain.

Examples of the active hydrogen group-containing compound containing an ionic group include an active hydrogen group-containing compound containing an anionic group and an active hydrogen group-containing compound containing a cationic group. The active hydrogen group-containing compound containing an anionic group is a compound having one or more anionic groups and two or more active hydrogen groups in combination. Examples of the anionic group include carboxy groups (carboxylic acid group) and sulfo groups (sulfonic acid group). The active hydrogen group-containing compound containing a cationic group is a compound having one or more cationic groups and two or more active hydrogen groups in combination. Examples of the cationic group include quaternary ammonium groups.

These active hydrogen group-containing compounds containing a hydrophilic group may be used alone or in combination of two or more. As the active hydrogen group-containing compound containing a hydrophilic group, preferably, an active hydrogen group-containing compound containing an anionic group is used.

In the active hydrogen group-containing compound containing an anionic group, examples of the anionic group include carboxy groups (carboxylic acid group) and sulfo groups (sulfonic acid group).

From the viewpoint of the gas barrier properties and water resistance, as the anionic group, preferably, a carboxy group is used. In the active hydrogen group-containing compound containing an anionic group, examples of the active hydrogen group include hydroxyl groups and amino groups, and preferably, a hydroxyl group is used. In other words, as the active hydrogen group-containing compound containing an anionic group, preferably, an organic compound having a carboxy group and two hydroxyl groups in combination is used.

Examples of the organic compound having a carboxy group and two hydroxyl groups in combination include carboxy group-containing polyols. An example of the carboxy group-containing polyol includes polyhydroxyalkanoic acid. Examples of the polyhydroxyalkanoic acid include 2,2-dimethylolacetic acid, 2,2-dimethylollactic acid, 2,2-dimethylolpropionic acid (also known as dimethylolpropionic acid), 2,2-dimethylolbutanoic acid, 2,2-dimethylolbutyric acid, and 2,2-dimethylolvaleric acid. These organic compounds having a carboxy group and two hydroxyl groups in combination may be used alone or in combination of two or more. As the organic compound having a carboxy group and two hydroxyl groups in combination, preferably, 2,2-dimethylolpropionic acid is used.

The content ratio of the active hydrogen group-containing compound containing a hydrophilic group is, for example, 10 parts by mass or more, preferably 20 parts by mass or more, and for example, 50 parts by mass or less, preferably 40 parts by mass or less with respect to 100 parts by mass of the total amount of the active hydrogen group-containing component.

In addition, the polyol component may further contain another low molecular weight polyol as an optional component. The other low molecular weight polyol is a low molecular weight polyol excluding the short-chain diol having 2 to 6 carbon atoms and the active hydrogen group-containing compound containing a hydrophilic group. The low molecular weight polyol is a relatively low molecular weight organic compound having two or more hydroxyl groups in a molecule. The molecular weight of the low molecular weight polyol is 50 or more, and 650 or less, preferably 500 or less. Examples of the other low molecular weight polyol include a diol having 7 or more carbon atoms and a trihydric or more low molecular weight polyol.

Examples of the diol having 7 or more carbon atoms include alkane (7 to 20 carbon atoms)-1,2-diol, 2,6-dimethyl-1-octene-3,8-diol, 1,3-cyclohexanedimethanol, 1,4-cyclohexanedimethanol, hydrogenated bisphenol A, and bisphenol A. These diols having 7 or more carbon atoms may be used alone or in combination of two or more.

Examples of the trihydric or more low molecular weight polyol include trihydric alcohols and tetrahydric alcohols. Examples of the trihydric alcohol include glycerin, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol. Examples of the tetrahydric alcohol include tetramethylolmethane(pentaerythritol) and diglycerine. These trihydric or more low molecular weight polyols may be used alone or in combination of two or more.

Furthermore, examples of the other low molecular weight polyol include a polyether polyol having a number average molecular weight of 650 or less, a polyester polyol having a number average molecular weight of 650 or less, and a polycarbonate polyol having a number average molecular weight of 650 or less.

These other low molecular weight polyols may be used alone or in combination of two or more. As the other low molecular weight polyol, from the viewpoint of the water resistance and water dispersion stability, preferably, a trihydric or more low molecular weight polyol is used, more preferably, a trihydric alcohol is used, particularly preferably, a trimethylolpropane is used.

When the active hydrogen group-containing component contains the trihydric or more alcohol, the ratio of the trihydric or more alcohol is, for example, 0.1 mol % or more, preferably 1 mol % or more, more preferably 3 mol % or more, and for example, 30 mol % or less, preferably 15 mol % or less, more preferably 10 mol % or less with respect to the total amount of the active hydrogen group-containing component.

In particular, when the polyisocyanate component contains the xylylene diisocyanate and the chain extender (described later) contains the ethylenediamine, the trihydric or more alcohol contributes to the heat resistance, the storage stability, and ease of production. Therefore, when the polyisocyanate component contains the xylylene diisocyanate and the chain extender (described later) contains the ethylenediamine, as long as the ratio of the trihydric or more alcohol is more than the above-described lower limit, it is possible to obtain the polyurethane resin having the more excellent heat resistance and the more excellent storage stability. Furthermore, when the polyisocyanate component contains the xylylene diisocyanate and the chain extender (described later) contains the ethylenediamine, as long as the ratio of the trihydric or more alcohol is less than the above-described upper limit, it is possible to obtain the polyurethane resin having the more excellent ease of production.

A mole ratio of the trihydric or more alcohol in the active hydrogen group-containing component is calculated by a known method based on a hydroxyl group equivalent (molecular weight/number of hydroxyl groups) and a mixing amount.

In addition, when the active hydrogen group-containing component contains the other low molecular weight polyol, the content ratio of the other low molecular weight polyol is, for example, 0.2 parts by mass or more, preferably 1 part by mass or more, more preferably 2 parts by mass or more, and for example, 20 parts by mass or less, preferably 10 parts by mass or less, more preferably 8 parts by mass or less with respect to 100 parts by mass of the total amount of the active hydrogen group-containing component.

In addition, as a combined ratio of the short-chain diol having 2 to 6 carbon atoms with the other low molecular weight polyol, the ratio of the other low molecular weight polyol is, for example, 2 parts by mass or more, preferably 5 parts by mass or more, and for example, 20 parts by mass or less, preferably 15 parts by mass or less, more preferably 10 parts by mass or less with respect to 100 parts by mass of the total amount of these.

In addition, the ratio of the active hydrogen group-containing compound containing a hydrophilic group is, for example, 10 parts by mass or more, preferably 20 parts by mass or more, more preferably 40 parts by mass or more, and for example, 90 parts by mass or less, preferably 80 parts by mass or less, more preferably 70 parts by mass or less with respect to 100 parts by mass of the total amount of the short-chain diol having 2 to 6 carbon atoms and the other low molecular weight polyol.

When the content ratio of the other low molecular weight polyol is within the above-described range, it is possible to ensure excellent dispersibility.

In addition, the polyol component may further contain a high molecular weight polyol as an optional component. The high molecular weight polyol is an organic compound (polymer) having two or more hydroxyl groups in a molecule and having a relatively high molecular weight. The number average molecular weight of the high molecular weight polyol is, for example, above 650, and for example, 20000 or less. Examples of the high molecular weight polyol include polyether polyols, polyester polyols, polycarbonate polyols, polyurethane polyols, epoxy polyols, vegetable oil polyols, polyolefin polyols, acrylic polyols, and vinyl monomer-modified polyols. These high molecular weight polyols may be used alone or in combination of two or more.

However, the high molecular weight polyol may lower the gas barrier properties of the polyurethane resin (described later). Therefore, the polyol component preferably does not contain the high molecular weight polyol.

In other words, the polyol component is preferably made of a short-chain diol having 2 to 6 carbon atoms, a trihydric or more low molecular weight polyol, and an active hydrogen group-containing compound containing a hydrophilic group, or is made of a short-chain diol having 2 to 6 carbon atoms and an active hydrogen group-containing compound containing a hydrophilic group. The polyol component is more preferably made of a short-chain diol having 2 to 6 carbon atoms, a trihydric or more low molecular weight polyol, and an active hydrogen group-containing compound containing an anionic group, or is made of a short-chain diol having 2 to 6 carbon atoms and an active hydrogen group-containing compound containing an anionic group.

The isocyanate group-terminated prepolymer is obtained by reacting each of the above-described components at a predetermined equivalent ratio. In synthesis of the isocyanate group-terminated prepolymer, the equivalent ratio is an equivalent ratio (isocyanate group/active hydrogen group) of an isocyanate group to an active hydrogen group (hydroxyl group).

The equivalent ratio (isocyanate group/active hydrogen group) is, for example, above 1, preferably 1.1 or more. Further, the equivalent ratio (isocyanate group/active hydrogen group) is, for example, 20 or less, preferably 10 or less.

In addition, in the synthesis of the isocyanate group-terminated prepolymer, a known polymerization method is used.

Examples of the polymerization method include bulk polymerization and solution polymerization.

As the polymerization method, from the viewpoint of adjusting reactivity, preferably, solution polymerization is used.

In the bulk polymerization, for example, the above-described components are blended and reacted under a nitrogen atmosphere. A reaction temperature is, for example, 75 to 85° C. The reaction time is, for example, 1 to 20 hours.

In the solution polymerization, for example, the above-described components are blended and reacted in an organic solvent under the nitrogen atmosphere. The reaction temperature is, for example, 20 to 80° C. The reaction time is, for example, 1 to 20 hours.

An example of the organic solvent includes a solvent inert to the isocyanate group. Examples of the organic solvent include acetone, methyl ethyl ketone, ethyl acetate, tetrahydrofuran, and acetonitrile. These organic solvents may be used alone or in combination of two or more.

In addition, in the above-described polymerization, a catalyst may be added if necessary. Examples of the catalyst include amine-based catalysts and organic metal catalysts. These catalysts may be used alone or in combination of two or more. An addition amount of the catalyst is appropriately set in accordance with its purpose and application.

In addition, in this method, the above-described polymerization is terminated, for example, when the isocyanate group concentration in the reaction product reaches a range to be described later. In addition, in this method, an unreacted polyisocyanate component may be removed by a known removal method. Examples of the removal method include distillation and extraction.

Thus, the isocyanate group-terminated prepolymer is obtained.

The isocyanate group concentration of the isocyanate group-terminated prepolymer is, for example, 4% by mass or more, preferably 5% by mass or more, more preferably 6% by mass or more. Further, the isocyanate group concentration of the isocyanate group-terminated prepolymer is, for example, 25% by mass or less, preferably 20% by mass or less, more preferably 17% by mass or less, further more preferably 15% by mass or less.

Further, an average functionality of the isocyanate group is, for example, 1.5 or more, preferably 1.9 or more, more preferably 2.0 or more. Further, the average functionality of the isocyanate group is, for example, 3.0 or less, preferably 2.5 or less.

In addition, when the anionic group is contained in the isocyanate group-terminated prepolymer, for example, a neutralizing agent is added to the isocyanate group-terminated prepolymer to be neutralized, thereby forming a salt of the anionic group. Examples of the neutralizing agent include conventional bases. Specific examples of the base include organic bases and inorganic bases.

Examples of the organic base include tertiary amines and secondary amines. Examples of the tertiary amine include trialkylamines and alkanolamines. An example of the trialkylamine includes a trialkylamine having 1 to 4 carbon atoms. Examples of the trialkylamine include trimethylamines and triethylamines. Examples of the alkanolamine include dimethylethanolamines, methyldiethanolamines, triethanolamines, and triisopropanolamines. Examples of the secondary amine include heterocyclic amines. Examples of the heterocyclic amine include morpholines. These organic bases may be used alone or in combination of two or more.

Examples of the inorganic base include ammonia, alkali metal hydroxide, alkaline earth metal hydroxide, and alkali metal carbonate. Examples of the alkali metal hydroxide include lithium hydroxide, sodium hydroxide, and potassium hydroxide. Examples of the alkaline earth metal hydroxide include magnesium hydroxide and calcium hydroxide. Examples of the alkali metal carbonate include sodium carbonate and potassium carbonate. These inorganic bases may be used alone or in combination of two or more.

These neutralizing agents may be used alone or in combination of two or more. As the neutralizing agent, preferably, an organic base is used, more preferably, a tertiary amine is used, further more preferably, a trialkylamine is used, particularly preferably, a triethylamine is used.

The addition amount of the neutralizing agent is, for example, 0.4 equivalents or more, preferably 0.6 equivalents or more with respect to 1 equivalent of the anionic group. Further, the addition amount of the neutralizing agent is, for example, 1.2 equivalents or less, preferably 1.0 equivalent or less with respect to 1 equivalent of the anionic group.

Next, in this method, the isocyanate group-terminated prepolymer (primary reaction product) and the chain extender are reacted, thereby obtaining a gas barrier polyurethane resin (secondary reaction product).

For example, a polyurethane dispersion is obtained by reacting the isocyanate group-terminated prepolymer with the chain extender in water.

The chain extender has a plurality of active hydrogen groups, and is an organic compound which subjects the isocyanate group-terminated prepolymer to a chain extension reaction.

The chain extender contains the ethylenediamine as an essential component.

When the chain extender contains the ethylenediamine and the polyisocyanate component contains the xylylene diisocyanate, it is possible to obtain the polyurethane resin having the excellent gas barrier properties, the excellent heat resistance, and the excellent storage stability due to their excellent crystallinity.

In addition, the chain extender may contain another chain extender as an optional component. The other chain extender is a chain extender excluding the ethylenediamine. Examples of the other chain extender include polyamines and amino alcohols.

Examples of the polyamine include aromatic polyamines, araliphatic polyamines, alicyclic polyamines, aliphatic polyamines (excluding the ethylenediamine), and polyoxyethylene group-containing polyamines.

Examples of the aromatic polyamine include 4,4'-diphenylmethanediamine and tolylenediamine.

Examples of the araliphatic polyamine include 1,3-xylylenediamine and 1,4-xylylenediamine.

Examples of the alicyclic polyamine include 3-aminomethyl-3,5,5-trimethylcyclohexylamine (also known as isophoronediamine), 4,4'-dicyclohexylmethandiamine, 2,5-bis(aminomethyl)bicyclo[2.2.1]heptane, 2,6-bis(aminomethyl)bicyclo[2.2.1]heptane, 1,4-cyclohexanediamine, 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, 1,3-bis(aminomethyl)cyclohexane, and 1,4-bis(aminomethyl)cyclohexane.

Examples of the aliphatic polyamine include propylenediamine, 1,3-propanediamine, 1,4-butanediamine, 1,5-pentanediamine, 1,6-hexamethylenediamine, hydrazine, hydrazine hydrate, diethylenetriamine, triethylenetetramine, tetraethylenepentamine, 1,2-diaminoethane, 1,2-diaminopropane, and 1,3-diaminopentane.

Examples of the polyoxyethylene group-containing polyamine include polyoxyalkylene ether diamines. Examples of the polyoxyalkylene ether diamine include polyoxyethylene ether diamines. More specifically, examples thereof include PEG #1000 diamine (manufactured by NOF CORPORATION), JEFFAMINE ED-2003 (manufactured by Huntsman Performance Products), JEFFAMINE EDR-148 (manufactured by Huntsman Performance Products), and JEFFAMINE XTJ-512 (manufactured by Huntsman Performance Products).

Examples of the amino alcohol include 2-((2-aminoethyl)amino)ethanol (also known as N-(2-aminoethyl)ethanolamine) and 2-((2-aminoethyl)amino)-1-methylpropanol (also known as N-(2-aminoethyl)isopropanolamine).

Further, examples of the other chain extender include an alkoxysilyl compound having a primary amino group and an alkoxysilyl compound having a primary amino group and a secondary amino group.

Examples of the alkoxysilyl compound having a primary amino group include γ-aminopropyltrimethoxysilane, γ-aminopropyltriethoxysilane, and N-phenyl-γ-aminopropyltrimethoxysilane.

Examples of the alkoxysilyl compound having a primary amino group and a secondary amino group include N-β (aminoethyl)γ-aminopropyltrimethoxysilane (also known as N-2-(aminoethyl)-3-aminopropyltrimethoxysilane), N-β (aminoethyl)γ-aminopropyltriethoxysilane (also known as N-2-(aminoethyl)3-aminopropyltriethoxysilane, N-β(aminoethyl)γ-aminopropylmethyldimethoxysilane (also known as N-2-(aminoethyl)-3-aminopropylmethyldimethoxysilane), and N-β(aminoethyl)γ-aminopropylmethyldiethoxysilane (also known as N-2-(aminoethyl)-3-aminopropylmethyldiethoxysilane).

These other chain extenders may be used alone or in combination of two or more.

As the other chain extender, preferably, an amino alcohol is used, more preferably, a 2-((2-aminoethyl)amino)ethanol is used.

In the chain extender, the content ratio of the ethylenediamine is 25 mol % or more, preferably 30 mol % or more, more preferably 50 mol % or more, further more preferably 70 mol % or more, even more preferably 90 mol % or more, particularly preferably 100 mol % with respect to the total amount of the chain extender.

In addition, when the content ratio of the ethylenediamine is below 100 mol %, a remaining portion is the other chain extender.

When the content ratio of the ethylenediamine is within the above-described range and the polyisocyanate component contains the xylylene diisocyanate, it is possible to obtain the polyurethane resin having the excellent gas barrier properties, the excellent heat resistance, and the excellent storage stability due to their excellent crystallinity.

It is possible to obtain the polyurethane resin containing the ethylenediamine and the other chain extender as a chain extender by, for example, collectively adding or sequentially adding the ethylenediamine and the other chain extender in a chain extension reaction to be described later.

Further, it is also possible to obtain the polyurethane resin containing the ethylenediamine and the other chain extender as a chain extender by, for example, mixing the polyurethane resin obtained by the chain extension reaction by the ethylenediamine and the polyurethane resin obtained by the chain extension reaction by the other chain extender.

In the chain extension reaction, for example, the isocyanate group-terminated prepolymer and the chain extender are reacted in water.

More specifically, for example, first, the isocyanate group-terminated prepolymer is water-dispersed.

Next, the chain extender is added to an aqueous dispersion liquid of the isocyanate group-terminated prepolymer, and the isocyanate group-terminated prepolymer is chain-extended by the chain extender. A method for water-dispersing the isocyanate group-terminated prepolymer is not particularly limited. For example, the isocyanate group-terminated prepolymer is added to water, while the water is stirred. In this case, the ratio of the water is 100 to 1000 parts by mass with respect to 100 parts by mass of the isocyanate group-terminated prepolymer.

Thereafter, the chain extender is added dropwise into the water, while the water in which the isocyanate group-terminated prepolymer is water-dispersed is stirred. In this case, the equivalent ratio (active hydrogen group/isocyanate group) of the active hydrogen group of the chain extender to the isocyanate group of the isocyanate group-terminated prepolymer is, for example, 0.6 to 1.2. The chain extension reaction is, for example, completed at room temperature. The time to complete the reaction is, for example, 0.1 to 10 hours.

In addition, in this method, it is possible to remove the organic solvent and/or the water after the completion of the reaction in order to adjust the solid content concentration. In addition, in this method, it is possible to add the water after the completion of the reaction in order to adjust the solid content concentration.

In addition, in this method, it is possible to add a solvent in order to adjust the solid content concentration. Examples of the solvent include water, methanol, ethanol, propanol, isopropanol, acetone, methyl ethyl ketone, ethyl acetate, tetrahydrofuran, and acetonitrile. These solvents may be used alone or in combination of two or more.

Thus, the polyurethane dispersion (PUD) is obtained.

The solid content concentration of the polyurethane dispersion is, for example, 10% by mass or more, preferably 15% by mass or more, more preferably 20% by mass or more. Further, the solid content concentration of the polyurethane dispersion is, for example, 60% by mass or less, preferably 50% by mass or less, more preferably 40% by mass or less.

A pH of the polyurethane dispersion is, for example, 5 or more, preferably 6 or more. Further, the pH of the polyurethane dispersion is, for example, 11 or less, preferably 10 or less.

An average particle size of the polyurethane dispersion is, for example, 10 nm or more, preferably 20 nm or more, more preferably 50 nm or more. In addition, the average particle size of the polyurethane dispersion is, for example, 500 nm or less, preferably 300 nm or less, more preferably 200 nm or less.

In addition, in the polyurethane dispersion, the total sum of the urethane group concentration and the urea group concentration is relatively high. By increasing the urethane group concentration and the urea group concentration, it is possible to improve the gas barrier properties.

The total sum of the urethane group concentration and the urea group concentration is, for example, 30% by mass or more, preferably 34% by mass or more, more preferably 38% by mass or more. In addition, the total sum of the urethane group concentration and the urea group concentration is, for example, 50% by mass or less, preferably 46% by mass or less, more preferably 42% by mass or less. The total sum of the urethane group concentration and the urea group concentration can be calculated from a charging ratio of raw material components.

Also, the polyurethane dispersion may contain an additive.

Examples of the additive include fillers, silane coupling agents (excluding the epoxysilane to be described later), alkoxysilane compounds, thickeners, antioxidants, heat stabilizers, ultraviolet absorbers, plasticizers, antistatic agents, lubricants, anti-blocking agents, surfactants, dispersion stabilizers, colorants, pigments, dyes, colloidal silicas, inorganic particles, inorganic oxide particles, layered inorganic compounds, leveling agents, crystal nucleating agents, cross-linking agents, and curing agents. These additives may be used alone or in combination of two or more. A mixing ratio of the additive is not particularly limited, and is appropriately set in accordance with its purpose and application.

In such a polyurethane dispersion, the polyisocyanate component contains the xylylene diisocyanate, and the chain extender contains the ethylenediamine at a predetermined ratio.

Therefore, the polyurethane dispersion contains the polyurethane resin having the excellent gas barrier properties, the excellent heat resistance, and the excellent storage stability.

The heat resistance of the polyurethane resin is evaluated by, for example, a coefficient of thermal expansion.

The coefficient of thermal expansion of the polyurethane resin is, for example, $2000\times10^{-6}K^{-1}$ or less, preferably $1500\times10^{-6}K^{-1}$ or less, more preferably $1000\times10^{-6}K^{-1}$ or less, further more preferably $500\times10^{-6}K^{-1}$ or less, particularly preferably $100\times10^{-6}K^{-1}$ or less. Further, the coefficient of thermal expansion of the polyurethane resin is usually $1\times10^{-6}K^{-1}$ or more.

The coefficient of thermal expansion of the polyurethane resin is measured using a film of the polyurethane resin in conformity with Examples to be described later.

Then, according to the above-described polyurethane dispersion, it is possible to form the polyurethane layer having the excellent gas barrier properties, the excellent heat resistance, and the excellent storage stability.

Therefore, the above-described polyurethane dispersion is preferably used as a gas barrier coating material.

The gas barrier coating material contains the above-described polyurethane dispersion.

Further, the gas barrier coating material may contain the additive. Examples of the additive include fillers, silane coupling agents (excluding the epoxysilane to be described later), alkoxysilane compounds, thickeners, antioxidants, heat stabilizers, ultraviolet absorbers, plasticizers, antistatic agents, lubricants, anti-blocking agents, surfactants, dispersion stabilizers, colorants, pigments, dyes, colloidal silicas, inorganic particles, inorganic oxide particles, layered inorganic compounds, leveling agents, crystal nucleating agents, cross-linking agents, and curing agents. These additives may be used alone or in combination of two or more. The mixing ratio of the additive is not particularly limited, and is appropriately set in accordance with its purpose and application.

In the polyurethane dispersion and the gas barrier coating material, as the additive, preferably, a curing agent is used. Examples of the curing agent include epoxy curing agents, melamine curing agents, carbodiimide curing agents, aziridine curing agents, oxazoline curing agents, isocyanate curing agents, and reactive curing agents. These may be used alone or in combination of two or more.

When the polyurethane resin contains the carboxy group as a hydrophilic group, as the curing agent, preferably, an epoxy curing agent, a carbodiimide curing agent, and an isocyanate curing agent are used.

The epoxy curing agent is a compound having an epoxy group. Examples of the epoxy curing agent include known epoxy curing agents, and preferably, an epoxysilane is used. When the polyurethane dispersion and the gas barrier coating material contain the epoxy curing agent, it is possible to obtain the polyurethane layer having excellent moist heat resistance (retort resistance). In particular, in the above-described polyurethane dispersion and the above-described gas barrier coating material, the chain extender contains the ethylenediamine. Therefore, the epoxy curing agent can more effectively improve the moist heat resistance (retort resistance) of the polyurethane layer.

An example of the epoxysilane includes a silane coupling agent containing an epoxy group. More specifically, examples of the epoxysilane include 3-glycidoxypropyltrimethoxysilane, 3-glycidoxypropyltriethoxysilane, 3-glycidoxypropylmethyldimethoxysilane, 3-glycidoxypropylmethyldiethoxysilane, and 2-(3,4-epoxycyclohexyl)ethyltrimethoxysilane. These may be used alone or in combination of two or more. As the epoxysilane, preferably, a trialkoxysilane is used, more preferably, a 3-glycidoxypropyltrimethoxysilane is used.

The epoxysilane is also available as a commercially available product. More specifically, examples of the commercially available product include KBM-403 (glycidoxypropyltrimethoxysilane), KBE-403 (3-glycidoxypropyltriethoxysilane), KBM-402 (3-glycidoxypropylmethyldimethoxysilane), KBE-402 (3-glycidoxypropylmethyldiethoxysilane), and KBM-303 (2-(3,4-epoxycyclohexyl)ethyltrimethoxysilane) (description above, manufactured by Shin-Etsu Chemical Co., Ltd.). These may be used alone or in combination of two or more.

When the epoxy curing agent (preferably, the epoxysilane) is used, the addition amount of the epoxy curing agent is appropriately set in accordance with its purpose and application. For example, when the polyurethane resin contains the carboxy group as a hydrophilic group, the ratio of the epoxy group in the epoxy curing agent is, for example, 0.1 mol or more, preferably 0.3 mol or more, more preferably 0.5 mol or more, further more preferably 0.8 mol or more with respect to 1.0 mol of the carboxy group in the polyurethane resin. In addition, the ratio of the epoxy group in the epoxy curing agent is, for example, 5.0 mol or less, preferably 3.0 mol or less, more preferably 2.1 mol or less, further more preferably 1.5 mol or less, particularly preferably 1.2 mol or less with respect to 1.0 mol of the carboxy group in the polyurethane resin.

In addition, the ratio of the epoxy curing agent is, for example, 1.0 part by mass or more, preferably 3.0 parts by mass or more, more preferably 5.0 parts by mass or more with respect to 100 parts by mass of the total amount of the solid content of the polyurethane dispersion and/or the gas barrier coating material. In addition, the ratio of the epoxy curing agent is, for example, 50.0 parts by mass or less, preferably 40.0 parts by mass or less, more preferably 30.0 parts by mass or less, further more preferably 20.0 parts by mass or less with respect to 100 parts by mass of the total amount of the solid content.

The carbodiimide curing agent is a compound having a carbodiimide group (carbodiimide compound). When the polyurethane dispersion and the gas barrier coating material contain the carbodiimide curing agent, it is possible to obtain the polyurethane layer having the excellent moist heat resistance (retort resistance). In particular, in the above-described polyurethane dispersion and the above-described gas barrier coating material, the chain extender contains the ethylenediamine. Therefore, the carbodiimide curing agent can more effectively improve the moist heat resistance (retort resistance) of the polyurethane layer.

When the carbodiimide curing agent (carbodiimide compound) is used, the addition amount of the carbodiimide curing agent is appropriately set in accordance with its purpose and application. For example, when the polyurethane resin contains the carboxy group as a hydrophilic group, the ratio of the carbodiimide group in the carbodiimide curing agent is, for example, 0.05 mol or more, preferably 0.1 mol or more, more preferably 0.3 mol or more, further more preferably 0.5 mol or more, even more preferably 0.7 mol or more, particularly preferably 0.9 mol or more with respect to 1.0 mol of the carboxy group in the polyurethane resin. In addition, the ratio of the carbodiimide group in the carbodiimide curing agent is, for example, 3.0 mol or less, preferably 2.0 mol or less, more preferably 1.5 mol or less, further more preferably 1.2 mol or less, particularly preferably 1.0 mol or less with respect to 1.0 mol of the carboxy group in the polyurethane resin.

Further, the ratio of the carbodiimide curing agent is, for example, 1.0 part by mass or more, preferably 5.0 parts by mass or more, more preferably 9.0 parts by mass or more, further more preferably 13.0 parts by mass or more, particularly preferably 16.0 parts by mass or more with respect to 100 parts by mass of the total amount of the solid content of the polyurethane dispersion and/or the gas barrier coating material. Further, the ratio of the carbodiimide curing agent is, for example, 70.0 parts by mass or less, preferably 65.0 parts by mass or less, more preferably 47.0 parts by mass or less, further more preferably 45.0 parts by mass, even more preferably 38.0 parts by mass or less, particularly preferably 32.0 parts by mass or less with respect to 100 parts by mass of the total amount of the solid content.

The carbodiimide curing agent may be also available as a commercially available product. Examples of the commercially available product of the carbodiimide curing agent include CARBODILITE V-02, CARBODILITE V-02-L2, CARBODILITE SV-02, CARBODILITE V-04, CARBODILITE V-10, CARBODILITE SW-12G, CARBODILITE E-02, CARBODILITE E-03A, and CARBODILITE E-05 (description above, manufactured by Nisshinbo Chemical Inc.); Lupranate MM-103 and XTB-3003 (description above, manufactured by BASF SE); Stabaxol P (manufactured by Sumitomo Bayer Urethane); and PICASSIAN XL-701, XL-702, XL-721, XL-725, XL-732, XL-752, XL-755, and XL-782 (description above, manufactured by STAHL POLYMERS).

Examples of the isocyanate curing agent include known isocyanate curing agents, and preferably, a water-dispersible polyisocyanate is used. When the polyurethane dispersion and the gas barrier coating material contain the isocyanate curing agent, it is possible to obtain the polyurethane layer having the excellent moist heat resistance (retort resistance). In particular, in the above-described polyurethane dispersion and the above-described gas barrier coating material, the chain extender contains the ethylenediamine. Therefore, the isocyanate curing agent can more effectively improve the moist heat resistance (retort resistance) of the polyurethane layer.

The water-dispersible polyisocyanate is a polyisocyanate dispersible in the water. An example of the water-dispersible polyisocyanate includes a polyisocyanate having an alkylene oxide group having 2 to 3 carbon atoms as a repeating unit. These may be used alone or in combination of two or more.

The water-dispersible polyisocyanate can be obtained by, for example, dispersing the polyisocyanate containing a polyethylene oxide group in the water by a known dispersant (an ionic dispersant, a nonionic dispersant, or the like). These water-dispersible polyisocyanates may be used alone or in combination of two or more.

When the isocyanate curing agent is used, the addition amount of the isocyanate curing agent is appropriately set in accordance with its purpose and application. For example, when the polyurethane resin contains the carboxy group as a hydrophilic group, the ratio of the isocyanate group in the isocyanate curing agent is, for example, 0.1 mol or more, preferably 0.5 mol or more, more preferably 0.8 mol or more, further more preferably 1.0 mol or more with respect to 1.0 mol of the carboxy group in the polyurethane resin. In addition, the ratio of the isocyanate group in the isocyanate curing agent is, for example, 5.0 mol or less, preferably 4.0 mol or less, more preferably 3.0 mol or less, further more preferably 2.1 mol or less, particularly preferably 1.8 mol or less with respect to 1.0 mol of the carboxy group in the polyurethane resin.

Further, the ratio of the isocyanate curing agent is, for example, 1.0 part by mass or more, preferably 3.0 parts by mass or more, further more preferably 5.0 parts by mass or more with respect to 100 parts by mass of the total amount of the solid content of the polyurethane dispersion and/or the gas barrier coating material. In addition, the ratio of the isocyanate curing agent is, for example, 50.0 parts by mass or less, preferably 40.0 parts by mass or less, more preferably 30.0 parts by mass or less, further more preferably 20.0 parts by mass or less with respect to 100 parts by mass of the total amount of the solid content.

The isocyanate curing agent may be also available as a commercially available product. Examples of the commercially available product of the isocyanate curing agent include TAKENATE WD-720, TAKENATE WD-725, TAKENATE WD-220, TAKENATE XWD-HS7, and TAKENATE XWD-HS30 (description above, manufactured by Mitsui Chemicals Inc.); AQUANATE 100, AQUANATE 110, AQUANATE 200, and AQUANATE 210 (manufactured by Nippon Polyurethane Industry Co., Ltd.); DURANATE WB40-100 and DURANATE WT20-100 (description above, manufactured by Asahikasei Chemicals Corporation); Bayhydur3100 and BayhydurXP2487/1 (description above, manufactured by Bayer MaterialScience Ltd.); and BasonatHW100 and BasonatHA100 (description above, manufactured by BASF SE).

From the viewpoint of improving the moist heat resistance (retort resistance), as the curing agent, preferably, an epoxysilane, a water-dispersible polyisocyanate, and a carbodiimide compound are used. In other words, the polyurethane dispersion preferably contains at least one kind selected from the group consisting of epoxysilane, water-dispersible polyisocyanate, and carbodiimide compound. When the polyurethane dispersion and the gas barrier coating material contain these curing agents, it is possible to obtain the polyurethane layer having the excellent moist heat resistance (retort resistance).

From the viewpoint of improving the moist heat resistance (retort resistance), as the curing agent, more preferably, a carbodiimide compound is used. In other words, the polyurethane dispersion more preferably contains the carbodiimide compound.

The timing of adding the curing agent is not particularly limited. For example, the curing agent may be added to the polyurethane dispersion and the gas barrier coating material before storage. Further, the curing agent may be, for example, also added to the polyurethane dispersion and the gas barrier coating material after the storage (that is, the polyurethane dispersion and the gas barrier coating material immediately before use).

When the curing agent is added to the polyurethane dispersion and the gas barrier coating material after the storage, the storage stability is required in a state before the curing agent is added. In other words, it may be sufficient that the polyurethane dispersion before the addition of the curing agent has the excellent storage stability.

It is also possible to adjust the solid content concentration of the gas barrier coating material by removing the water from the polyurethane dispersion. Further, by adding the water to the polyurethane dispersion, it is possible to adjust the solid content concentration of the gas barrier coating material. Furthermore, by adding the above-described solvent to the polyurethane dispersion, it is also possible to adjust the solid content concentration of the gas barrier coating material.

The solid content concentration of the gas barrier coating material is, for example, 10% by mass or more, preferably 15% by mass or more, more preferably 20% by mass or more. Further, the solid content concentration of the polyurethane dispersion is, for example, 60% by mass or less, preferably 50% by mass or less, more preferably 40% by mass or less.

Since such a gas barrier coating material contains the above-described polyurethane dispersion, it is possible to form the polyurethane layer having the excellent gas barrier properties, the excellent heat resistance, and the excellent storage stability. Therefore, it is possible to preferably use the gas barrier coating material in producing a laminate including a polyurethane layer as a gas barrier layer.

In FIG. 1, a laminate 1 includes a substrate 2 and a polyurethane layer 3 disposed on the surface of the substrate 2. Examples of the substrate 2 include plastic, metal vapor deposition plastic, paper, cloth, wood, metal, and ceramics. These may be used alone or in combination of two or more.

As the substrate 2, preferably, plastic, metal vapor deposition plastic, and paper are used.

Examples of the plastic include thermoplastic resins and thermosetting resins, and preferably, a thermoplastic resin is used. Examples of the thermoplastic resin include polyolefin resins, polyester resins, polyamide resins, vinyl resins, acrylic resins, polycarbonate resins, and cellulose resins. These may be used alone or in combination of two or more. As the thermoplastic resin, preferably, a polyolefin resin, a polyester resin, and a polyamide resin are used.

Further, examples of the substrate 2 include non-oriented substrates, uniaxially oriented substrates, and biaxially oriented substrates. Further, the substrate 2 may be a single layer or a plurality of layers. Further, the substrate 2 may be surface-treated. Examples of the surface treatment include corona discharge treatments and anchor coat treatments.

Examples of a shape of the substrate 2 include film shapes, sheet shapes, bottle shapes, and cup shapes. Preferably, a film shape is used.

A thickness of the substrate 2 is, for example, 3 m or more, preferably 5 m or more. Further, the thickness of the substrate 2 is, for example, 500 m or less, preferably 200 m or less.

The polyurethane layer 3 contains the above-described polyurethane resin, and preferably consists of the above-described polyurethane resin. As the polyurethane layer 3, preferably, a dried product of the gas barrier coating material is used.

In other words, from the viewpoint of production efficiency, the polyurethane layer 3 is preferably formed by coating the gas barrier coating material onto the substrate 2 to be dried. More specifically, in order to form the polyurethane layer 3, the above-described gas barrier coating material is coated onto the substrate 2 to be dried. The method for coating the gas barrier coating material is not particularly limited. Examples of the coating method include dip coating methods, gravure coating methods, reverse coating methods, roll coating methods, bar coating methods, spray coating methods, air knife coating methods, and in-line coating methods.

The drying conditions of the gas barrier coating material are not particularly limited. A drying temperature is, for example, 40° C. or more, preferably 50° C. or more. Further, the drying temperature is, for example, 200° C. or less, preferably 180° C. or less. Further, the drying time is, for example, 0.1 minutes or more, preferably 0.2 minutes or more. Further, the drying time is, for example, 10 minutes or less, preferably 5 minutes or less.

Thus, the polyurethane layer 3 made of the polyurethane resin is formed on the substrate 2. As a result, the laminate 1 including the substrate 2 and the polyurethane layer 3 is obtained.

Further, the polyurethane layer 3 may be aged if necessary.

The aging conditions of the polyurethane layer 3 are not particularly limited. An aging temperature is, for example, 20° C. or more, preferably 30° C. or more. Further, the aging temperature is, for example, 100° C. or less, preferably 80° C. or less. Further, the aging time is, for example, 1 hour or more, preferably 10 hours or more. Further, the aging time is, for example, 10 days or less, preferably 7 days or less.

A lamination amount of the polyurethane layer 3 is, for example, 0.1 $g/m^2$ or more, preferably 0.2 $g/m^2$ or more, more preferably 0.3 $g/m^2$ or more. Further, the lamination amount of the polyurethane layer 3 is, for example, 10 $g/m^2$ or less, preferably 7 $g/m^2$ or less, more preferably 5 $g/m^2$ or less.

Further, in the laminate 1, the polyurethane layer 3 may be an overcoating layer.

Or, the polyurethane layer 3 may be an anchor coating layer. When the polyurethane layer 3 is the overcoating layer, the polyurethane layer 3 is an outermost layer in the laminate 1.

In addition, when the polyurethane layer 3 is the anchor coating layer, the polyurethane layer 3 is an intermediate layer in the laminate 1. In such a case, the laminate 1 may further include a vapor deposition layer (not shown) laminated on the polyurethane layer 3. The vapor deposition layer is laminated on the polyurethane layer 3 by a known vapor deposition method.

Further, a total thickness of the laminate 1 is, for example, 5 m or more, preferably 10 m or more. Further, the total thickness of the laminate 1 is, for example, 1 mm or less, preferably 0.5 mm or less.

Such a laminate 1 includes the polyurethane layer 3 obtained by using the above-described gas barrier coating material. More specifically, the polyurethane layer 3 is the dried product of the above-described gas barrier coating material.

In other words, in the above-described laminate 1, the polyurethane layer 3 contains the polyurethane resin, and in the polyurethane resin, the polyisocyanate component contains the xylylene diisocyanate and the chain extender contains the ethylenediamine at a predetermined ratio. Therefore, the above-described laminate 1 has the excellent gas barrier properties and the excellent heat resistance. Furthermore, when the polyurethane layer 3 contains the curing agent, the above-described laminate 1 has the excellent moist heat resistance (retort resistance).

Therefore, the laminate 1 has the excellent gas barrier properties and the excellent heat resistance. Therefore, the laminate 1 is preferably used in various industrial fields. Preferably, the laminate 1 is preferably used as a packaging material.

Examples of the packaging material include food packaging films, pharmaceutical packaging films, food packaging containers, optical films, and industrial films. In particular, since the laminate 1 has the excellent heat resistance, it is preferably used as a food packaging film to be subjected to a high-temperature sterilization treatment and a food packaging film to be subjected to cooking.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Synthesis Example 1

The following raw material components were reacted at 65 to 70° C. under a nitrogen atmosphere until the isocyanate group concentration (NCO %) was 9.53% by mass or less. Thus, a reaction liquid containing an isocyanate group-terminated prepolymer was obtained.

Raw Material Components 1,3-xylylenediisocyanate (TAKENATE 500, 1,3-XDI, manufactured by Mitsui Chemicals Inc.): 148.2 parts by mass methylenebis (cyclohexyl isocyanate)

(Vestanat$H_{12}$MDI, HuMDI, manufactured by Evonik Industries AG): 25.8 parts by mass ethylene glycol: 29.9 parts by mass trimethylolpropane: 2.3 parts by mass dimethylolpropionic acid: 17.0 parts by mass methyl ethyl ketone (solvent): 126.9 parts by mass Next, the reaction liquid was cooled to 40° C. Next, 12.6 parts by mass of triethylamine was added to the reaction liquid, thereby neutralizing the isocyanate group-terminated prepolymer. Next, the reaction liquid was dispersed in 1000.0 parts by mass of ion-exchanged water with a homodisper. Next, an amine aqueous solution was added to the obtained dispersion liquid and subjected to a chain extension reaction to be then aged for 1 hour. The amine aqueous solution was a liquid mixture of 50.0 parts by mass of ion-exchanged water and 14.3 parts by mass of ethylenediamine. Thereafter, the methyl ethyl ketone and the ion-exchanged water were distilled off with an evaporator. Thus, the solid content concentration was adjusted to 30% by mass. Thus, a polyurethane dispersion (PUD) containing a gas barrier polyurethane resin was obtained.

A mole ratio of a trihydric or more alcohol (trimethylolpropane) in an active hydrogen group-containing component was calculated by a known method based on a hydroxyl group equivalent (molecular weight/number of hydroxyl groups) and a mixing amount. More specifically, the ratio of the trimethylolpropane to the active hydrogen group-containing component was 4.0 mol % as shown in the following formula.

$$(2.3\text{ parts by mass}/44.725)/[(29.9\text{ parts by mass}/31.034)+(2.3\text{ parts by mass}/44.725)+(17.0\text{ parts by mass}/67.066)]\times 100=4.0\text{ mol }\%$$

hydroxyl equivalent of ethylene glycol: 31.034 hydroxyl equivalent of trimethylolpropane: 44.725 hydroxyl equivalent of dimethylolpropanoic acid: 67.066

Synthesis Examples 2 to 18

A polyurethane dispersion was obtained in the same manner as in Synthesis Example 1 in accordance with the formulations described in Tables 1 to 2.

Examples 1 to 12 and Comparative Examples 1 to 10

A polyurethane dispersion, a solvent (isopropanol), and ion-exchanged water were mixed in the formulations described in Tables 3 to 4. Thus, a gas barrier coating material was obtained.

<Evaluation>

(1) Storage Stability (Thermal Stability)

The viscosity at 25° C. of each of the polyurethane dispersions of Synthesis Examples was measured under the following conditions.

Device: manufactured by Toki Sangyo Co., Ltd., RB-85L

Number of rotations: 12 rpm, 30 rpm, 60 rpm

Rotor number: No. 1 Next, the polyurethane dispersion was stored at 40° C. for 14 days. Thereafter, the viscosity at 25° C. of the polyurethane dispersion was measured under the above-described conditions. Then, an increase rate of the viscosity was determined by the following formula.

$$\text{Viscosity increase rate }(\%)=\text{viscosity after storage}\times 100/\text{viscosity before storage}$$

(2) Coefficient of Thermal Expansion

Each of the polyurethane dispersions of Synthesis Examples was placed in a plastic tray, dried under the conditions of 25° C. and relative humidity of 55% for one day, and then, heated at 110° C. for one hour. Thus, a film of a polyurethane resin (thickness of 200 m) was obtained. Next, the obtained film was cut into a length of 20 mm×width of 5 mm. Thus, a sample was obtained. Thereafter, a coefficient of thermal expansion of the sample was measured using a thermomechanical analyzer (manufactured by SHIMADZU CORPORATION, TMA-50). The measurement conditions were set as follows: nitrogen atmosphere (gas flow rate of 40 mL/min), load setting of 0 g, and temperature rising rate of 10° C./min. Further, the measurement was in conformity with JIS K7197 (1991).

Figure 2:
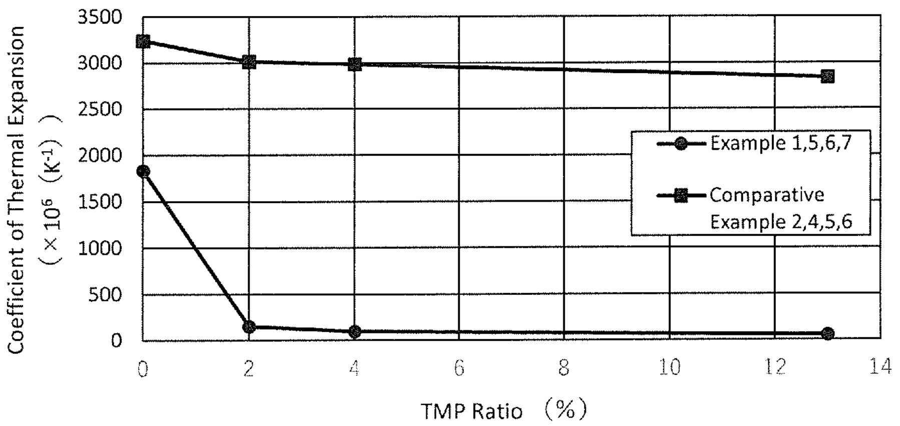
FIG. 2 shows a correlation diagram for illustrating a relationship between a coefficient of thermal expansion and a ratio of trimethylolpropane in Examples 1 and 5 to 7 and Comparative Examples 2 and 4 to 6.

Further, a relationship between the coefficient of thermal expansion and the ratio (TMP ratio) of the trimethylolpropane with respect to the total amount of the active hydrogen group-containing component was shown in FIG. 2 based on Examples 1 and 5 to 7 and Comparative Examples 2 and 4 to 6.

That is, each of the chain extenders of Examples included the ethylenediamine. Therefore, when the active hydrogen group-containing component contained the trimethylolpropane, a degree of improvement in the heat resistance was particularly large. On the other hand, each of the chain extenders of Comparative Examples did not contain the ethylenediamine. Therefore, when the active hydrogen group-containing component contained the trimethylolpropane, the degree of improvement in the heat resistance was small.

Figure 3:
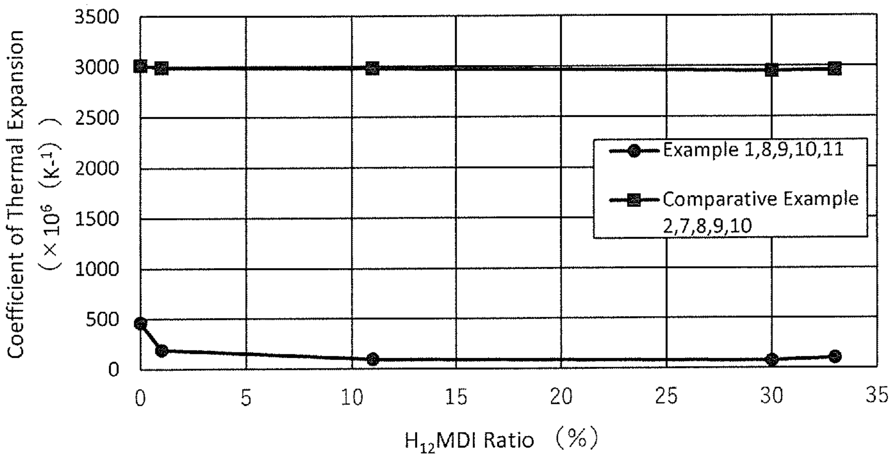
FIG. 3 shows a correlation diagram for illustrating a relationship between a coefficient of thermal expansion and a ratio of methylenebis(cyclohexyl isocyanate) in Examples 1 and 8 to 11 and Comparative Examples 2 and 7 to 10.

Further, the relationship between the coefficient of thermal expansion and the ratio (HuMDI ratio) of the methylenebis(cyclohexyl isocyanate) with respect to the total amount of the polyisocyanate component was shown in FIG. 3 based on Examples 1 and 8 to 11 and Comparative Examples 2 and 7 to 10.

That is, each of the chain extenders of Examples included the ethylenediamine. Therefore, when the polyisocyanate component contained the methylenebis(cyclohexyl isocyanate), the degree of improvement in the heat resistance was particularly large. On the other hand, each of the chain extenders of Comparative Examples did not contain the ethylenediamine. Therefore, when the polyisocyanate component contained the methylenebis(cyclohexyl isocyanate), the degree of improvement in the heat resistance was small.

(3) Gas Barrier Properties (Substrate: Polyethylene Terephthalate Film)

As the substrate, a polyethylene terephthalate film was prepared. The polyethylene terephthalate film was a biaxially oriented polyester film (trade name: Toyobo Ester Film E5102, manufactured by TOYOBO CO., LTD., thickness of 12 m).

Next, a gas barrier coating material was coated onto the substrate using a bar coater. A coating amount was set at the thickness of 1 g/m$^2$ at drying.

Next, the film coated with the gas barrier coating material was placed in a drying oven set at 110° C. for 1 minute to be dried. Thus, a laminate including the substrate and a polyurethane layer was obtained. Thereafter, oxygen permeability of the laminate was measured using an oxygen permeability measurement device (manufactured by MOCON Inc., OX-TRAN2/20). The measurement conditions were set at 20° C. and relative humidity of 70% (70% RH). Further, the measurement was in conformity with JIS K7126-2 (2006). Further, an oxygen permeation amount (cc/m$^2$·day·atm) per m$^2$, day, and atmospheric pressure was measured.

TABLE 1

| | | No. | | | | |
|---|---|---|---|---|---|---|
| | | Synthesis Ex. 1 | Synthesis Ex. 2 | Synthesis Ex. 3 | Synthesis Ex. 4 | Synthesis Ex. 5 |
| Mixing Formulation (parts by mass) | Polyisocyanate Component | | | | | |
| | m-XDI | 148.2 | 148.2 | 148.2 | 148.2 | 148.2 |
| | H12MDI | 25.8 | 25.8 | 25.8 | 25.8 | 25.8 |
| | 1,4-H6XDI | — | — | — | — | — |
| | Active Hydrogen Group-Containing Component | | | | | |
| | Ethylene Glycol | 29.9 | 29.9 | 26.3 | 30.7 | 31.5 |
| | Trimethylolpropane | 2.3 | 2.3 | 7.4 | 1.1 | — |
| | Dimethylol Propionic Acid | 17.0 | 17.0 | 17.1 | 16.9 | 16.9 |
| | Organic Solvent | | | | | |
| | Methyl Ethyl Ketone | 126.9 | 126.9 | 127.8 | 126.7 | 126.5 |
| | Acrylonitrile | — | — | — | — | — |
| | Neutralizing Agent | | | | | |
| | Triethylamine | 12.6 | 12.6 | 12.6 | 12.5 | 12.5 |
| | Ion-Exchanged Water | 1000.0 | 1050.0 | 1010.0 | 1000.0 | 1000.0 |
| | Chain Extender | | | | | |
| | Ion-Exchanged Water | 50.0 | 50.0 | 50.0 | 50.0 | 50.0 |
| | 2-(2-aminoethylamino)ethanol | — | 24.8 | — | — | — |
| | Ethylenediamine | 14.3 | — | 14.3 | 14.3 | 14.3 |
| Trihydric or More Alcohol Ratio in Active Hydrogen Group-Containing Component (mol %) | | 4.0 | 4.0 | 13.0 | 2.0 | 0.0 |
| Ethylenediamine Ratio in Chain Extender (mol %) | | 100 | 0 | 100 | 100 | 100 |

| | | No. | | | |
|---|---|---|---|---|---|
| | | Synthesis Ex. 6 | Synthesis Ex. 7 | Synthesis Ex. 8 | Synthesis Ex. 9 |
| Mixing Formulation (parts by mass) | Polyisocyanate Component | | | | |
| | m-XDI | 104.5 | 110.8 | 170.0 | 172.3 |
| | H12MDI | 72.8 | 66.1 | 2.4 | — |
| | 1,4-H6XDI | — | — | — | — |
| | Active Hydrogen Group-Containing Component | | | | |
| | Ethylene Glycol | 27.6 | 27.9 | 31.0 | 31.1 |
| | Trimethylolpropane | 2.1 | 2.1 | 2.3 | 2.3 |
| | Dimethylol Propionic Acid | 17.0 | 17.0 | 17.0 | 17.0 |
| | Organic Solvent | | | | |
| | Methyl Ethyl Ketone | 127.4 | 127.3 | 126.7 | 126.7 |
| | Acrylonitrile | — | — | — | — |
| | Neutralizing Agent | | | | |
| | Triethylamine | 12.6 | 12.6 | 12.6 | 12.6 |
| | Ion-Exchanged Water | 1000.0 | 1000.0 | 1000.0 | 1000.0 |
| | Chain Extender | | | | |
| | Ion-Exchanged Water | 50.0 | 50.0 | 50.0 | 50.0 |
| | 2-(2-aminoethylamino)ethanol | — | — | — | — |
| | Ethylenediamine | 13.4 | 13.6 | 14.7 | 14.8 |
| Trihydric or More Alcohol Ratio in Active Hydrogen Group-Containing Component (mol %) | | 4.0 | 4.0 | 4.0 | 4.0 |
| Ethylenediamine Ratio in Chain Extender (mol %) | | 100 | 100 | 100 | 100 |

TABLE 2

| | | No. | | | | |
|---|---|---|---|---|---|---|
| | | Synthesis Ex. 10 | Synthesis Ex. 11 | Synthesis Ex. 12 | Synthesis Ex. 13 | Synthesis Ex. 14 |
| Mixing Formulation (parts by mass) | Polyisocyanate Component | | | | | |
| | m-XDI | 164.3 | — | 148.2 | 148.2 | 148.2 |
| | H12MDI | — | — | 25.8 | 25.8 | 25.8 |
| | 1,4-H6XDI | — | 166.0 | — | — | — |
| | Active Hydrogen Group-Containing Component | | | | | |
| | Ethylene Glycol | 27.0 | 26.5 | 26.3 | 30.7 | 31.5 |
| | Trimethylolpropane | — | — | 7.4 | 1.1 | — |
| | Dimethylol Propionic Acid | 29.2 | 28.7 | 17.1 | 16.9 | 16.9 |
| | Organic Solvent | | | | | |
| | Methyl Ethyl Ketone | — | — | 127.8 | 126.7 | 126.5 |
| | Acrylonitrile | 102.1 | 102.2 | — | — | — |
| | Neutralizing Agent | | | | | |
| | Triethylamine | 17.6 | 17.3 | 12.6 | 12.5 | 12.5 |
| | Ion-Exchanged Water | 1030.0 | 1030.0 | 1060.0 | 1050.0 | 1050.0 |
| | Chain Extender | | | | | |
| | Ion-Exchanged Water | 50.0 | 50.0 | 50.0 | 50.0 | 50.0 |
| | 2-(2-aminoethylamino)ethanol | — | — | 24.8 | 24.8 | 24.8 |
| | Ethylenediamine | 11.8 | 11.6 | — | — | — |
| Trihydric or More Alcohol Ratio in Active Hydrogen Group-Containing Component (mol %) | | 0 | 0 | 13.0 | 2.0 | 0 |
| Ethylenediamine Ratio in Chain Extender (mol %) | | 100 | 100 | 0 | 0 | 0 |

| | | No. | | | |
|---|---|---|---|---|---|
| | | Synthesis Ex. 15 | Synthesis Ex. 16 | Synthesis Ex. 17 | Synthesis Ex. 18 |
| Mixing Formulation (parts by mass) | Polyisocyanate Component | | | | |
| | m-XDI | 104.5 | 110.8 | 170.0 | 172.3 |
| | H12MDI | 72.8 | 66.1 | 2.4 | — |
| | 1,4-H6XDI | — | — | — | — |
| | Active Hydrogen Group-Containing Component | | | | |
| | Ethylene Glycol | 27.6 | 27.9 | 31.0 | 31.1 |
| | Trimethylolpropane | 2.1 | 2.2 | 2.3 | 2.3 |
| | Dimethylol Propionic Acid | 16.9 | 16.9 | 17.0 | 17.0 |
| | Organic Solvent | | | | |
| | Methyl Ethyl Ketone | 127.4 | 127.3 | 126.7 | 126.7 |
| | Acrylonitrile | — | — | — | — |
| | Neutralizing Agent | | | | |
| | Triethylamine | 12.5 | 12.5 | 12.6 | 12.6 |
| | Ion-Exchanged Water | 1050.0 | 1050.0 | 1050.0 | 1050.0 |
| | Chain Extender | | | | |
| | Ion-Exchanged Water | 50.0 | 50.0 | 50.0 | 50.0 |
| | 2-(2-aminoethylamino)ethanol | 23.3 | 23.5 | 25.5 | 25.6 |
| | Ethylenediamine | — | — | — | — |
| Trihydric or More Alcohol Ratio in Active Hydrogen Group-Containing Component (mol %) | | 4.0 | 4.0 | 4.0 | 4.0 |
| Ethylenediamine Ratio in Chain Extender (mol %) | | 0 | 0 | 0 | 0 |

TABLE 3

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Mixing Formulation (parts by mass) | Synthesis Ex. 1 | 100 | 74.2 | 49.0 | 24.2 | — | — | — | — | — | — | — | — |
| | Synthesis Ex. 2 | — | 25.8 | 51.0 | 75.8 | — | — | — | — | — | — | — | — |
| | Synthesis Ex. 3 | — | — | — | — | 100 | — | — | — | — | — | — | — |
| | Synthesis Ex. 4 | — | — | — | — | — | 100 | — | — | — | — | — | — |
| | Synthesis Ex. 5 | — | — | — | — | — | — | 100 | — | — | — | — | — |
| | Synthesis Ex. 6 | — | — | — | — | — | — | — | 100 | — | — | — | — |
| | Synthesis Ex. 7 | — | — | — | — | — | — | — | — | 100 | — | — | — |
| | Synthesis Ex. 8 | — | — | — | — | — | — | — | — | — | 100 | — | — |
| | Synthesis Ex. 9 | — | — | — | — | — | — | — | — | — | — | 100 | — |
| | Synthesis Ex. 10 | — | — | — | — | — | — | — | — | — | — | — | 100 |
| | Synthesis Ex. 11 | — | — | — | — | — | — | — | — | — | — | — | — |
| | Synthesis Ex. 12 | — | — | — | — | — | — | — | — | — | — | — | — |
| | Synthesis Ex. 13 | — | — | — | — | — | — | — | — | — | — | — | — |
| | Synthesis Ex. 14 | — | — | — | — | — | — | — | — | — | — | — | — |

TABLE 3-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| | Synthesis Ex. 15 | — | — | — | — | — | — | — | — | — | — | — | — |
| | Synthesis Ex. 16 | — | — | — | — | — | — | — | — | — | — | — | — |
| | Synthesis Ex. 17 | — | — | — | — | — | — | — | — | — | — | — | — |
| | Synthesis Ex. 18 | — | — | — | — | — | — | — | — | — | — | — | — |
| | Isopropanol | 25 | 25 | 25 | 25 | 25 | 25 | 25 | 25 | 25 | 25 | 25 | 25 |
| | Ion-Exchanged Water | 125 | 125 | 125 | 125 | 125 | 125 | 125 | 125 | 125 | 125 | 125 | 125 |
| | Ethylenediamine Ratio (mol %) | 100 | 75 | 50 | 25 | 100 | 100 | 100 | 100 | 100 | 100 | 100 | 100 |
| Evaluation | Coefficient of Thermal Expansion $\times 10^6$ [$K^{-1}$] | 96 | 707 | 1053 | 1063 | 55 | 153 | 1838 | 103 | 77 | 191 | 462 | 1923 |
| | Oxygen Permeability [cc/(m2 · day · atm)] | 102 | 102 | 101 | 100 | 107 | 101 | 99 | 158 | 122 | 95 | 94 | — |
| | Viscosity before Storage Stability Test [mPa · s] | 52 | 41 | 27 | 12 | 75 | 46 | 43 | 210 | 120 | 42 | 40 | — |
| | Viscosity after Storage Stability Test [mPa · s] | 58 | 45 | 30 | 14 | 83 | 55 | 56 | 672 | 168 | 46 | 52 | — |
| | Viscosity Increase Rate | 112% | 110% | 110% | 120% | 110% | 120% | 130% | 320% | 140% | 110% | 130% | — |

TABLE 4

| | | Comparative Ex. 1 | Comparative Ex. 2 | Comparative Ex. 3 | Comparative Ex. 4 | Comparative Ex. 5 |
|---|---|---|---|---|---|---|
| Mixing Formulation (parts by mass) | Synthesis Ex. 1 | 19.4 | — | — | — | — |
| | Synthesis Ex. 2 | 80.6 | 100 | — | — | — |
| | Synthesis Ex. 3 | — | — | — | — | — |
| | Synthesis Ex. 4 | — | — | — | — | — |
| | Synthesis Ex. 5 | — | — | — | — | — |
| | Synthesis Ex. 6 | — | — | — | — | — |
| | Synthesis Ex. 7 | — | — | — | — | — |
| | Synthesis Ex. 8 | — | — | — | — | — |
| | Synthesis Ex. 9 | — | — | — | — | — |
| | Synthesis Ex. 10 | — | — | — | — | — |
| | Synthesis Ex. 11 | — | — | 100 | — | — |
| | Synthesis Ex. 12 | — | — | — | 100 | — |
| | Synthesis Ex. 13 | — | — | — | — | 100 |
| | Synthesis Ex. 14 | — | — | — | — | — |
| | Synthesis Ex. 15 | — | — | — | — | — |
| | Synthesis Ex. 16 | — | — | — | — | — |
| | Synthesis Ex. 17 | — | — | — | — | — |
| | Synthesis Ex. 18 | — | — | — | — | — |
| | Isopropanol | 25 | 25 | 25 | 25 | 25 |
| | Ion-Exchanged Water | 125 | 125 | 125 | 125 | 125 |
| | Ethylenediamine Ratio (mol %) | 20 | 0 | 0 | 0 | 0 |
| Evaluation | Coefficient of Thermal Expansion $\times 10^6$ [$K^{-1}$] | 2513 | 2982 | 4503 | 2837 | 3015 |
| | Oxygen Permeability [cc/(m2 · day · atm)] | 100 | 99 | — | 134 | 100 |
| | Viscosity before Storage Stability Test [mPa · s] | 38 | 10 | — | 14 | 9 |
| | Viscosity after Storage Stability Test [mPa · s] | 46 | 11 | — | 15 | 11 |
| | Viscosity Increase Rate | 120% | 110% | — | 110% | 120% |

| | | Comparative Ex. 6 | Comparative Ex. 7 | Comparative Ex. 8 | Comparative Ex. 9 | Comparative Ex. 10 |
|---|---|---|---|---|---|---|
| Mixing Formulation (parts by mass) | Synthesis Ex. 1 | — | — | — | — | — |
| | Synthesis Ex. 2 | — | — | — | — | — |
| | Synthesis Ex. 3 | — | — | — | — | — |
| | Synthesis Ex. 4 | — | — | — | — | — |
| | Synthesis Ex. 5 | — | — | — | — | — |
| | Synthesis Ex. 6 | — | — | — | — | — |
| | Synthesis Ex. 7 | — | — | — | — | — |
| | Synthesis Ex. 8 | — | — | — | — | — |
| | Synthesis Ex. 9 | — | — | — | — | — |
| | Synthesis Ex. 10 | — | — | — | — | — |
| | Synthesis Ex. 11 | — | — | — | — | — |
| | Synthesis Ex. 12 | — | — | — | — | — |
| | Synthesis Ex. 13 | — | — | — | — | — |
| | Synthesis Ex. 14 | 100 | — | — | — | — |
| | Synthesis Ex. 15 | — | 100 | — | — | — |
| | Synthesis Ex. 16 | — | — | 100 | — | — |
| | Synthesis Ex. 17 | — | — | — | 100 | — |
| | Synthesis Ex. 18 | — | — | — | — | 100 |

TABLE 4-continued

| | | | | | | |
|---|---|---|---|---|---|---|
| | Isopropanol | 25 | 25 | 25 | 25 | 25 |
| | Ion-Exchanged Water | 125 | 125 | 125 | 125 | 125 |
| | Ethylenediamine Ratio (mol %) | 0 | 0 | 0 | 0 | 0 |
| Evaluation | Coefficient of Thermal Expansion $\times 10^6$ [$K^{-1}$] | 3242 | 2959 | 2951 | 2991 | 3012 |
| | Oxygen Permeability [cc/(m2 · day · atm)] | 98 | 195 | 147 | 95 | 93 |
| | Viscosity before Storage Stability Test [mPa · s] | 8 | 75 | 68 | 8 | 8 |
| | Viscosity after Storage Stability Test [mPa · s] | 10 | 210 | 101 | 10 | 11 |
| | Viscosity Increase Rate | 120% | 280% | 149% | 120% | 140% |

Example 13

A polyurethane dispersion, an isocyanate curing agent (TAKENATE WD-725, manufactured by Mitsui Chemicals Inc.), a solvent (isopropanol), and ion-exchanged water were mixed in the formulations described in Table 5. Thus, a gas barrier coating material was obtained.

(4) Gas Barrier Properties (Substrate: Polypropylene Film)

As the substrate, a polypropylene film was prepared. The polypropylene film was a non-oriented polypropylene film (Tohcello CP RXC-22 (CPP film), #60, manufactured by Mitsui Chemicals Tohcello Inc.).

Next, the gas barrier coating material was coated onto the substrate using the bar coater. The coating amount was set at the thickness of 3 $g/m^2$ at drying. Next, the film coated with the gas barrier coating material was placed in the drying oven set at 80° C. for one minute to be dried. Thereafter, it was heated at 40° C. for two days. Thus, a laminate including the substrate and a polyurethane layer was obtained. Thereafter, the oxygen permeation amount was measured in the same manner as in Example 1.

Example 14

A polyurethane dispersion, an isocyanate curing agent (TAKENATE WD-725, manufactured by Mitsui Chemicals Inc.), a solvent (isopropanol), ion-exchanged water, and a leveling agent (BYK-348, manufactured by BYK JAPAN KK.) were mixed in the formulations described in Table 5. Thus, a gas barrier coating material was obtained.

(5) Gas Barrier Properties (Substrate: Polyethylene Film)

As the substrate, a polyethylene film was prepared. The polyethylene film was a low-density polyethylene film (LLDPE film, manufactured by Mitsui Chemicals Tohcello Inc., TUXHC, thickness of 60 m). Next, the gas barrier coating material was coated onto the substrate using the bar coater. The coating amount was set at the thickness of 3 $g/m^2$ at drying.

Next, the film coated with the gas barrier coating material was placed in the drying oven set at 80° C. for one minute to be dried. Thereafter, it was heated at 40° C. for two days. Thus, a laminate including the substrate and a polyurethane layer was obtained. Thereafter, the oxygen permeation amount was measured in the same manner as in Example 1.

Example 15

A polyurethane dispersion, an isocyanate curing agent (TAKENATE WD-725, manufactured by Mitsui Chemicals Inc.), a solvent (isopropanol), and ion-exchanged water were mixed in the formulations described in Table 5. Thus, a gas barrier coating material was obtained.

(6) Gas Barrier Properties (Substrate: Polypropylene Film)

As the substrate, a polypropylene film was prepared. The polypropylene film was a non-oriented polypropylene film (Tohcello CP RXC-22 (CPP film), #60, manufactured by Mitsui Chemicals Tohcello Inc.). Next, the gas barrier coating material was coated onto the substrate using the bar coater. The coating amount was set at the thickness of 0.5 $g/m^2$ at drying.

Next, the film coated with the gas barrier coating material was placed in the drying oven set at 80° C. for one minute to be dried. Thereafter, it was heated at 40° C. for two days. Next, after attachment to a vacuum aluminum deposition device (manufactured by SHOWA SHINKU CO., LTD., SIP600), aluminum was set as a vapor deposition source, and next, a vacuum degree in a vapor deposition chamber was set at $2\times10^{-3}$ mbar. Thereafter, a current value was gradually increased, the aluminum was dissolved at 700 mA, and the aluminum was vapor-deposited for the total vapor deposition time of 3 seconds. Thus, a laminate including the substrate, a polyurethane layer, and a vapor deposition layer was obtained. Thereafter, the oxygen permeation amount was measured in the same manner as in Example 1.

Example 16

A polyurethane dispersion, an isocyanate curing agent (TAKENATE WD-725, manufactured by Mitsui Chemicals Inc.), a solvent (isopropanol), ion-exchanged water, and a leveling agent (BYK-348, manufactured by BYK JAPAN KK.) were mixed in the formulations described in Table 5. Thus, a gas barrier coating material was obtained.

(7) Gas Barrier Properties (Substrate: Polyethylene Film)

A laminate including the substrate, the polyurethane layer, and the vapor deposition layer was obtained in the same manner as in Example 15, except that a low-density polyethylene film (LLDPE film, manufactured by Mitsui Chemicals Tohcello Inc., TUXHC, thickness of 60 m) was used instead of the non-oriented polypropylene film. Thereafter, the oxygen permeation amount was measured in the same manner as in Example 1.

Example 17

A polyurethane dispersion, an isocyanate curing agent (TAKENATE WD-725, manufactured by Mitsui Chemicals Inc.), a solvent (isopropanol), and ion-exchanged water were mixed in the formulations described in Table 5. Thus, a gas barrier coating material was obtained.

(8) Gas Barrier Properties (Substrate: Polypropylene Film)

As the substrate, a polypropylene film was prepared. The polypropylene film was a non-oriented polypropylene film (Tohcello CP RXC-22 (CPP film), #100, manufactured by Mitsui Chemicals Tohcello Inc.). Next, the gas barrier coating material was coated onto the substrate using the bar coater. The coating amount was set at the thickness of 0.5 $g/m^2$ at drying.

Next, the film coated with the gas barrier coating material was placed in the drying oven set at 80° C. for one minute to be dried. Thereafter, it was heated at 40° C. for two days. Next, the resulting film was heated at a preheat temperature of 158° C. for one minute using a batch stretching machine, and stretched by six times in a flow direction of the film.

Next, after attachment to the vacuum aluminum deposition device (manufactured by SHOWA SHINKU CO., LTD., SIP600), aluminum was set as the vapor deposition source, and next, the vacuum degree in the vapor deposition chamber was set at $2\times10^{-3}$ mbar.

Thereafter, the current value was gradually increased, the aluminum was dissolved at 700 mA, and the aluminum was vapor-deposited for the total vapor deposition time of 3 seconds. Thus, a laminate including the substrate, a polyurethane layer, and a vapor deposition layer was obtained. Thereafter, the oxygen permeation amount was measured in the same manner as in Example 1.

Example 18

Ion-exchanged water, a polyurethane dispersion, a thickener (PRIMAL RM-8W, manufactured by The Dow Chemical Company, solid content concentration of 21.5%), and a swellable layered inorganic compound (NTS-5, manufactured by TOPY INDUSTRIES, LIMITED, solid content concentration of 6%) were blended and mixed with a mixer in the formulations described in Table 5. Thus, a gas barrier coating material was obtained.

(9) Gas Barrier Properties (Substrate: Paper)

The above-described gas barrier coating material was coated onto a coated surface of coating paper (N-coat wrap L, manufactured by Nippon Paper Industries, Co., Ltd., basis weight of 65 $g/m^2$) as a paper substrate with the bar coater, and the coating film was dried at 120° C. for 90 seconds. Next, the above-described gas barrier coating material was further coated with the bar coater, and the coating film was dried at 120° C. for 90 seconds. Thereafter, the resulting coating film was aged under the conditions of 23° C. and 50% RH for two days. Thus, a polyurethane layer was formed on one surface of the paper substrate, thereby obtaining a laminate. The coating amount was set at the thickness of 6.0 $g/m^2$ at drying. Thereafter, the oxygen permeation amount was measured in the same manner as in Example 1.

Example 19

Water, a polyurethane dispersion, a thickener (PRIMAL RM-8W, manufactured by The Dow Chemical Company, solid content concentration of 21.5%), and a swellable layered inorganic compound (ME300-B4T, manufactured by Katakura & Co-op Agri Corporation, solid content concentration of 8%) were blended and mixed with a mixer in the formulations described in Table 5. Thus, a gas barrier coating material was obtained.

(10) Gas Barrier Properties (Substrate: Paper)

The above-described gas barrier coating material was coated onto the coated surface of coating paper (N-coat wrap L, manufactured by Nippon Paper Industries, Co., Ltd., basis weight of 65 $g/m^2$) as a paper substrate with the bar coater, and the coating film was dried at 120° C. for 90 seconds. Next, the above-described gas barrier coating material was further coated with the bar coater, and the coating film was dried at 120° C. for 90 seconds. Thereafter, the resulting coating film was aged under the conditions of 23° C. and 50% RH for two days. Thus, a polyurethane layer was formed on one surface of the paper substrate, thereby obtaining a laminate. The coating amount was set at the thickness of 6.0 $g/m^2$ at drying. Thereafter, the oxygen permeation amount was measured in the same manner as in Example 1.

Example 20

Ion-exchanged water, a polyurethane dispersion, and a swellable layered inorganic compound (NTS-5, manufactured by TOPY INDUSTRIES, LIMITED, solid content concentration of 6%) were blended and mixed with a mixer in the formulations described in Table 5. Thus, a gas barrier coating material was obtained.

(11) Gas Barrier Properties (Substrate: Paper)

As an anchor coating material, OJb-51 (aqueous dispersion liquid of water-dispersible acrylic resin, solid content of 25%) was coated onto the coated surface of coating paper (N-coat wrap L, manufactured by Nippon Paper Industries, Co., Ltd., basis weight of 65 $g/m^2$) as a paper substrate with the bar coater, and dried at 120° C. for 90 seconds. The coating amount of the anchor coating material was set at the thickness of 2.0 $g/m^2$ at drying.

Next, the above-described gas barrier coating material was coated with the bar coater, and the coating film was dried at 120° C. for 90 seconds. The coating amount of the gas barrier coating material was set at the thickness of 2.5 $g/m^2$ at drying. Thereafter, the resulting coating film was aged under the conditions of 23° C. and 50% RH for two days. Thus, a polyurethane layer was formed on one surface of the paper substrate, thereby obtaining a laminate. Thereafter, the oxygen permeation amount was measured in the same manner as in Example 1.

Example 21

A polyurethane dispersion, a solvent (isopropanol), an epoxysilane (KBM-403, manufactured by Shin-Etsu Chemical Co., Ltd.), and ion-exchanged water were mixed in the formulations described in Table 5. Thus, a gas barrier coating material was obtained.

(12) Gas Barrier Properties (Substrate: Aluminum Oxide Vapor-Deposited Polyethylene Terephthalate)

As the substrate, an aluminum oxide vapor-deposited polyethylene terephthalate (Barrialox 1011HG (#12), manufactured by TORAY ADVANCED FILM CO., LTD.) was prepared. Next, the gas barrier coating material was coated onto the substrate using the bar coater. The coating amount was set at the thickness of 0.5 $g/m^2$ at drying.

Next, the film coated with the gas barrier coating material was placed in the drying oven set at 110° C. for one minute to be dried. Thereafter, it was heated at 50° C. for two days. Thus, a laminate including the substrate and a polyurethane layer was obtained. Thereafter, the oxygen permeation amount was measured in the same manner as in Example 1.

Example 22 to 32 and Comparative Examples 11 to 14

A polyurethane dispersion, a solvent (isopropanol), ion-exchanged water, and a curing agent were mixed in the formulations described in Tables 6 to 7. Thus, a gas barrier coating material was obtained.

(13) Gas Barrier Properties and Retort Resistance

In Examples 22 to 28 and 31 to 32 and Comparative Examples 11 to 13, as the substrate, an alumina vapor-deposited polyethylene terephthalate film (alumina vapor-deposited PET, TL-PET-H, manufactured by Mitsui Chemicals Tohcello Inc.) was prepared.

In addition, in Examples 29 to 30 and Comparative Example 14, as the substrate, an alumina vapor-deposited biaxially oriented polypropylene film (alumina vapor-deposited OPP) was prepared. The alumina vapor-deposited OPP was a laminated film in which aluminum oxide ($Al_2O_3$) was vapor-deposited (under $1\times10^{-4}$ Pa vacuum conditions, RH-type) on one surface of a biaxially oriented polypropylene film (high-heat resistance PYLEN film, thickness of 20 m, manufactured by TOYOBO CO., LTD.) using a vacuum vapor deposition machine (manufactured by ULVAC, INC.) to form a metal vapor-deposited layer having a thickness of 10 nm.

Next, the gas barrier coating material was coated onto the alumina vapor-deposited PET using the bar coater. The coating amount was set at the thickness of 0.5 g/m$^2$ at drying. Next, the film coated with the gas barrier coating material was placed in the drying oven set at 110° C. for one minute to be dried. Thereafter, it was heated at 50° C. for two days. Thus, a laminate including the substrate and a polyurethane layer was obtained.

Further, the gas barrier coating material was coated onto the alumina vapor-deposited OPP using the bar coater. The coating amount was set at the thickness of 0.5 g/m$^2$ at drying. Next, the film coated with the gas barrier coating material was placed in the drying oven set at 80° C. for one minute to be dried. Thereafter, it was heated at 50° C. for two days. Thus, a laminate including the substrate and a polyurethane layer was obtained.

Thereafter, the oxygen permeability of the laminate was measured using the oxygen permeability measurement device (manufactured by MOCON Inc., OX-TRAN2/20). The measurement conditions were set at 20° C. and relative humidity of 70% (70% RH). Further, the measurement was in conformity with JIS K7126-2 (2006). Further, the oxygen permeation amount (cc/m$^2$·day·atm) per m$^2$, day, and atmospheric pressure was measured.

Next, the laminate was immersed in hot water at 120° C. for 30 minutes to be subjected to hot water treatment. Thereafter, the oxygen permeability of the laminate which was subjected to the hot water treatment was measured under the above-described conditions. Then, an increase rate of the oxygen permeability was determined by the following formula. The higher the increase rate in the oxygen permeability, the lower the evaluation of the retort resistance. [(oxygen permeability after hot water treatment-oxygen permeability before hot water treatment)/oxygen permeability before hot water treatment]

(14) Adhesion and Retort Resistance

As an adhesive, a mixture (TAKELAC A-310/TAKENATE A-3=10/1 (mass ratio)) of TAKELAC A-310 (manufactured by Mitsui Chemicals Inc.) and TAKENATE A-3 (manufactured by Mitsui Chemicals Inc.) was coated onto the polyurethane layer of the laminate using the bar coater so as to have the thickness of 3.0 g/m$^2$ at drying to be dried with a dryer.

Next, a non-oriented polypropylene film (Tohcello CP RXC-22 (CPP film), #60, manufactured by Mitsui Chemicals Tohcello Inc.) was laminated onto the coated surface of the adhesive, and aged at 50° C. for three days. Thus, a laminate film was obtained.

The laminate strength of the laminate film was measured by a T-shaped peel test (width of 15 mm) in conformity with JIS K 6854 (1999). Further, the laminate film was immersed in hot water at 120° C. for 30 minutes, and subjected to hot water treatment. Thereafter, the laminate strength of the laminate film which was subjected to the hot water treatment was measured under the above-described conditions.

(15) Coefficient of Thermal Expansion

Each of the gas barrier coating materials was placed in a plastic tray, dried under the conditions of 25° C. and relative humidity of 55% for one day, and then, heated at 110° C. for one hour. Thus, a film of a polyurethane resin (thickness of 200 m) was obtained. Next, the obtained film was cut into a length of 20 mm×width of 5 mm. Thus, a sample was obtained. Thereafter, a coefficient of thermal expansion of the sample was measured using a thermomechanical analyzer (manufactured by SHIMADZU CORPORATION, TMA-50). The measurement conditions were set as follows: nitrogen atmosphere (gas flow rate of 40 mL/min), load setting of 0 g, and temperature rising rate of 10° C./min. Further, the measurement was in conformity with JIS K7197 (1991).

TABLE 5

| | | | No. | | | | |
|---|---|---|---|---|---|---|---|
| | | | Ex. 13 | Ex. 14 | Ex. 15 | Ex. 16 | Ex. 17 |
| Mixing Formulation (parts by mass) | PUD | Synthesis Ex. 1 | 22.9 | 22.9 | 22.9 | 22.9 | 22.9 |
| | Water-Dispersible Polyisocyanate | WD-725 | 1.14 | 1.14 | 1.14 | 1.14 | 1.14 |
| | Solvent | 2-propanol | 15.0 | 15.0 | 15.0 | 15.0 | 15.0 |
| | Water | Ion-Exchanged Water | 61.0 | 61.0 | 61.0 | 61.0 | 61.0 |
| | Leveling Agent | BYK-348 | 0.0 | 0.2 | 0.0 | 0.2 | 0.0 |
| | Layered Inorganic Compound | NTS-5 | — | — | — | — | — |
| | | ME300-B4T | — | — | — | — | — |
| | Thickener | RM-8W | — | — | — | — | — |
| | Epoxysilane | KBM-403 | — | — | — | — | — |
| Substrate | | Kind | CPP | LLDPE | CPP | LLDPE | CPP |
| | | Stretch Treatment | Absence | Absence | Absence | Absence | Presence |
| Polyurethane Layer | | Kind | Over | Over | Anchor | Anchor | Anchor |
| | | Coating Amount [g/cm2] | 3.0 | 3.0 | 0.5 | 0.5 | 0.5 |
| Evaluation | Oxygen Permeability [cc/(m2 · day · atm)] | | 33 | 35 | 0.4 | 0.5 | 0.5 |

TABLE 5-continued

| | | | Ex. 18 | Ex. 19 | Ex. 20 | Ex. 21 |
|---|---|---|---|---|---|---|
| Mixing Formulation (parts by mass) | PUD | Synthesis Ex. 1 | 49.8 | 49.8 | 51.0 | 24.0 |
| | Water-Dispersible Polyisocyanate | WD-725 | — | — | — | — |
| | Solvent | 2-propanol | — | — | — | 15.0 |
| | Water | Ion-Exchanged Water | 15.3 | 4.3 | 4.0 | 60.2 |
| | Leveling Agent | BYK-348 | — | — | — | — |
| | Layered Inorganic Compound | NTS-5 | 43.9 | — | 45.0 | — |
| | | ME300-B4T | — | 32.9 | — | — |
| | Thickener | RM-8W | 2.0 | 2.0 | — | — |
| | Epoxysilane | KBM-403 | — | — | — | 0.80 |
| Substrate | | Kind | Paper | Paper | Paper | AlOxPET |
| | | Stretch Treatment | — | — | — | — |
| Polyurethane Layer | | Kind | Over | Over | Over | Over |
| | | Coating Amount [g/cm2] | 6.0 | 6.0 | 2.5 | 0.5 |
| Evaluation | Oxygen Permeability [cc/(m2 · day · atm)] | | 1.3 | 1.1 | 3.2 | 0.5 |

TABLE 6

| | | | | Ex. 22 | Ex. 23 | Ex. 24 | Ex. 25 |
|---|---|---|---|---|---|---|---|
| Mixing Formulation (parts by mass) | PUD | | Synthesis Ex. 1 | 32.2 | 34.6 | 34.1 | 36.0 |
| | | | Synthesis Ex. 2 | — | — | — | — |
| | Solvent | | 2-Propanol | 15.0 | 15.0 | 15.0 | 15.0 |
| | Water | | Ion-Exchanged Water | 47.9 | 47.0 | 47.2 | 48.0 |
| | Curing Agent | Epoxysilane | KBM-403 | — | — | — | 1.0 |
| | | Water-Dispersible Polyisocyanate | Bayhydur3100 | — | — | — | — |
| | | Carbodiimide Compound | V-02 | 4.9 | — | — | — |
| | | | V-02-L2 | — | 3.4 | — | — |
| | | | SV-02 | — | — | 3.7 | — |
| Substrate | | | Kind | Alumina Vapor-Deposited PET | Alumina Vapor-Deposited PET | Alumina Vapor-Deposited PET | Alumina Vapor-Deposited PET |
| Mixing Amount of Curing Agent (Epoxy Group, Isocyanate Group, Carbodiimide Group/Carboxy Group in Polyurethane Resin) [Mole Ratio] | | | | 0.9 | 0.9 | 0.9 | 0.9 |
| Evaluation | Oxygen Permeability | Before Hot Water Treatment | [cc/(m2 · day · atm)] | 0.5 | 0.5 | 0.5 | 0.5 |
| | | After Hot Water Treatment | [cc/(m2 · day · atm)] | 0.6 | 0.6 | 0.6 | 0.8 |
| | | Increase Rate of Oxygen Permeability | % | 20% | 20% | 20% | 60% |
| | Peel Strength | Before Hot Water Treatment | [N/15 mm] | 5.0 | MF | MF | MF |
| | | After Hot Water Treatment | [N/15 mm] | 2.3 | 2.6 | 2.8 | 3.0 |
| | Coefficient of Thermal Expansion | | $\times 10^6$ [$K^{-1}$] | 110 | 100 | 100 | 100 |

| | | | | Ex. 26 | Ex. 27 | Ex. 28 |
|---|---|---|---|---|---|---|
| Mixing Formulation (parts by mass) | PUD | | Synthesis Ex. 1 | 27.4 | 36.5 | 32.5 |
| | | | Synthesis Ex. 2 | — | — | — |
| | Solvent | | 2-Propanol | 15.0 | 15.0 | 15 |
| | Water | | Ion-Exchanged Water | 56.3 | 46.3 | 47.8 |
| | Curing Agent | Epoxysilane | KBM-403 | — | — | — |
| | | Water-Dispersible Polyisocyanate | Bayhydur3100 | 1.3 | 2.2 | 4.7 |
| | | Carbodiimide Compound | V-02 | — | — | — |
| | | | V-02-L2 | — | — | — |
| | | | SV-02 | — | — | — |
| Substrate | | | Kind | Alumina Vapor-Deposited PET | Alumina Vapor-Deposited PET | Alumina Vapor-Deposited PET |
| Mixing Amount of Curing Agent (Epoxy Group, Isocyanate Group, Carbodiimide Group/Carboxy Group in Polyurethane Resin) [Mole Ratio] | | | | 1.6 | 0.6 | 1.2 |
| Evaluation | Oxygen Permeability | Before Hot Water Treatment | [cc/(m2 · day · atm)] | 0.6 | 0.6 | 0.7 |
| | | After Hot Water Treatment | [cc/(m2 · day · atm)] | 1 | 1 | 1.2 |
| | | Increase Rate of Oxygen Permeability | % | 67% | 67% | 71% |

TABLE 6-continued

| | | | | | |
|---|---|---|---|---|---|
| Peel Strength | Before Hot Water Treatment | [N/15 mm] | MF | MF | MF |
| | After Hot Water Treatment | [N/15 mm] | 2.3 | 2.5 | 2.6 |
| Coefficient of Thermal Expansion | | $\times 10^6$ [$K^{-1}$] | 100 | 110 | 120 |

TABLE 7

| | | | | No. | | | |
|---|---|---|---|---|---|---|---|
| | | | | Ex. 29 | Ex. 30 | Comparative Ex. 11 | Comparative Ex. 12 |
| Mixing Formulation (parts by mass) | PUD | | Synthesis Ex. 1 | 32.2 | 36.0 | — | — |
| | | | Synthesis Ex. 2 | — | — | 33.3 | 27.0 |
| | Solvent | | 2-Propanol | 15.0 | 15.0 | 15.0 | 15.0 |
| | Water | | Ion-Exchanged Water | 47.9 | 48.0 | 51.7 | 53.3 |
| | Curing Agent | Epoxysilane | KBM-403 | — | 1.0 | — | — |
| | | Water-Dispersible Polyisocyanate | Bayhydur3100 | — | — | — | — |
| | | Carbodiimide Compound | V-02 | 4.9 | — | — | 4.7 |
| | | | V-02-L2 | — | — | — | — |
| | | | SV-02 | — | — | — | — |
| Substrate | | | Kind | Alumina Vapor-Deposited OPP | Alumina Vapor-Deposited OPP | Alumina Vapor-Deposited PET | Alumina Vapor-Deposited PET |
| Mixing Amount of Curing Agent (Epoxy Group, Isocyanate Group, Carbodiimide Group/Carboxy Group in Polyurethane Resin) [Mole Ratio] | | | | 0.9 | 0.9 | — | 0.9 |
| Evaluation | Oxygen Permeability | Before Hot Water Treatment | [cc/(m2 · day · atm)] | 4.2 | 4.1 | 0.5 | 0.5 |
| | | After Hot Water Treatment | [cc/(m2 · day · atm)] | 6.3 | 6.6 | 28 | 9.6 |
| | | Increase Rate of Oxygen Permeability | % | 50% | 61% | 5500% | 1820% |
| | Peel Strength | Before Hot Water Treatment | [N/15 mm] | 4.0 | 4.0 | MF | 3.2 |
| | | After Hot Water Treatment | [N/15 mm] | 1.8 | 1.7 | 1.7 | 1.8 |
| | Coefficient of Thermal Expansion | | $\times 10^6$ [$K^{-1}$] | 110 | 110 | 2200 | 370 |

| | | | | No. | | | |
|---|---|---|---|---|---|---|---|
| | | | | Comparative Ex. 13 | Ex. 31 | Ex. 32 | Comparative Ex. 14 |
| Mixing Formulation (parts by mass) | PUD | | Synthesis Ex. 1 | — | 40.0 | 24.7 | — |
| | | | Synthesis Ex. 2 | 30.0 | — | — | 27 |
| | Solvent | | 2-Propanol | 15.0 | 15.0 | 15 | 15 |
| | Water | | Ion-Exchanged Water | 54.0 | 45.0 | 50.8 | 53.3 |
| | Curing Agent | Epoxysilane | KBM-403 | 1.0 | — | — | — |
| | | Water-Dispersible Polyisocyanate | Bayhydur3100 | — | — | — | — |
| | | Carbodiimide Compound | V-02 | — | — | 9.5 | 4.7 |
| | | | V-02-L2 | — | — | — | — |
| | | | SV-02 | — | — | — | — |
| Substrate | | | Kind | Alumina Vapor-Deposited PET | Alumina Vapor-Deposited PET | Alumina Vapor-Deposited PET | Alumina Vapor-Deposited OPP |
| Mixing Amount of Curing Agent (Epoxy Group, Isocyanate Group, Carbodiimide Group/Carboxy Group in Polyurethane Resin) [Mole Ratio] | | | | 0.9 | — | 3.2 | 0.9 |
| Evaluation | Oxygen Permeability | Before Hot Water Treatment | [cc/(m2 · day · atm)] | 0.5 | 0.5 | 0.5 | 4.2 |
| | | After Hot Water Treatment | [cc/(m2 · day · atm)] | 10 | 25 | 13 | 93 |
| | | Increase Rate of Oxygen Permeability | % | 1900% | 4900% | 2500% | 2114% |
| | Peel Strength | Before Hot Water Treatment | [N/15 mm] | 3.2 | MF | MF | 3.2 |
| | | After Hot Water Treatment | [N/15 mm] | 1.8 | 0.6 | 0.6 | 0.6 |
| | Coefficient of Thermal Expansion | | $\times 10^6$ [$K^{-1}$] | 150 | 130 | 140 | 370 |

The details of abbreviations in Tables are described below.

PUD: polyurethane dispersion

BYK-348: trade name BYK-348, leveling agent, manufactured by BYK JAPAN KK.

NTS-5: trade name NTS-5, layered inorganic compound, manufactured by TOPY INDUSTRIES, LIMITED ME300-B4T: trade name ME300-B4T, layered inorganic compound, manufactured by Katakura & Co-op Agri Corporation RM-8W: trade name PRIMAL RM-8W, thickener, manufactured by The Dow Chemical Company CPP: non-oriented polypropylene film LLDPE: low-density polyethylene film AlOxPET: aluminum oxide vapor-deposited polyethylene terephthalate Over: overcoating layer Anchor: anchor coating layer KBM-403: trade name KBM-403, epoxysilane, manufactured by Shin-Etsu Chemical Co., Ltd.

WD-725: trade name TAKENATE WD-725, water-dispersible polyisocyanate, manufactured by Mitsui Chemicals Inc.

Bayhydur3100: trade name Bayhydur3100, water-dispersible polyisocyanate, manufactured by BASF SE V-02: carbodiimide compound, trade name CARBODILITE V-02, solid content concentration of 40% by mass, manufactured by Nisshinbo Chemical Inc.

V-02-L2: carbodiimide compound, trade name CARBODILITE V-02-L2, solid content concentration of 40% by mass, manufactured by Nisshinbo Chemical Inc.

SV-02: carbodiimide compound, trade name CARBODILITE SV-02, solid content concentration of 40% by mass, manufactured by Nisshinbo Chemical Inc.

MF: material failure

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The polyurethane dispersion, the gas barrier coating material, and the laminate of the present invention are preferably used in a food packaging film to be subjected to a high-temperature sterilization treatment and a food packaging film to be subjected to cooking.

DESCRIPTION OF REFERENCE NUMERALS

1 Laminate
2 Substrate
3 Polyurethane layer

The invention claimed is:

1. A polyurethane dispersion being an aqueous dispersion of a polyurethane resin, wherein the polyurethane resin is a reaction product of an isocyanate group-terminated prepolymer and a chain extender;

the isocyanate group-terminated prepolymer includes a reaction product of a polyisocyanate component containing a xylylene diisocyanate, and an active hydrogen group-containing component containing a short-chain diol having 2 to 6 carbon atoms and an active hydrogen group-containing compound containing a hydrophilic group;

the chain extender includes an ethylenediamine;

a ratio of the ethylenediamine is 25 mol % or more with respect to the total amount of the chain extender, the polyisocyanate component further contains a methylenebis(cyclohexyl isocyanate), and a content ratio of the methylenebis(cyclohexyl isocyanate) is 1 mol % or more and 30 mol % or less with respect to the total amount of the polyisocyanate component.

2. The polyurethane dispersion according to claim 1, wherein the active hydrogen group-containing component further contains a trihydric or more alcohol, and a ratio of the trihydric or more alcohol is 1 mol % or more and 15 mol % or less with respect to the total amount of the active hydrogen group-containing component.

3. The polyurethane dispersion according to claim 1, wherein a coefficient of thermal expansion of the polyurethane resin is $2000\times10^{-6}$ $K^{-1}$ or less.

4. The polyurethane dispersion according to claim 1 further comprising:

at least one kind selected from the group consisting of epoxysilane, water-dispersible polyisocyanate, and carbodiimide compound.

5. The polyurethane dispersion according to claim 4, wherein a content ratio of a carbodiimide group in the carbodiimide compound is 0.3 mol or more and 3.0 mol or less with respect to 1 mol of a carboxy group in the polyurethane resin.

6. A gas barrier coating material comprising:

the polyurethane dispersion according to claim 1.

7. A laminate comprising:

a substrate and a polyurethane layer disposed on the surface of the substrate, wherein the polyurethane layer is a dried product of the gas barrier coating material according to claim 6.

* * * * *